United States Patent
Lee et al.

(10) Patent No.: US 9,225,922 B2
(45) Date of Patent: Dec. 29, 2015

(54) IMAGE-SENSING DEVICES AND METHODS OF OPERATING THE SAME

(75) Inventors: Tae-Yon Lee, Seoul (KR); Yoon-Dong Park, Yongin-si (KR); Yong-Jei Lee, Seongnam-si (KR); Seoung-Hyun Kim, Seoul (KR); Joo-Yeong Gong, Seongnam-si (KR); Sung-Kwon Hong, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 711 days.

(21) Appl. No.: 13/550,838

(22) Filed: Jul. 17, 2012

(65) Prior Publication Data

US 2013/0020463 A1    Jan. 24, 2013

(30) Foreign Application Priority Data

Jul. 21, 2011   (KR) .................. 10-2011-0072210

(51) Int. Cl.
*H04N 5/357*   (2011.01)
*H04N 5/378*   (2011.01)
*H04N 5/369*   (2011.01)
*H04N 5/3745*  (2011.01)

(52) U.S. Cl.
CPC ............. *H04N 5/357* (2013.01); *H04N 5/3696* (2013.01); *H04N 5/378* (2013.01); *H04N 5/3745* (2013.01)

(58) Field of Classification Search
CPC ....... H04N 5/335; H04N 5/357; H04N 5/378; H04N 5/374; H04N 5/372; H04N 5/3745; H04N 5/37452; H04N 5/369; H04N 5/3696; H04N 5/363
See application file for complete search history.

(56) References Cited

U.S. PATENT DOCUMENTS

| 6,388,243 | B1* | 5/2002 | Berezin et al. ............. 250/208.1 |
| 7,671,391 | B2 | 3/2010 | Kawahito |
| 8,344,306 | B2* | 1/2013 | Kim ........................... 250/208.1 |
| 8,462,247 | B2* | 6/2013 | Kim et al. ..................... 348/308 |
| 8,487,232 | B2* | 7/2013 | Iwamoto et al. ........... 250/208.1 |
| 8,569,671 | B2* | 10/2013 | Meynants et al. .......... 250/208.1 |
| 8,633,431 | B2* | 1/2014 | Kim ........................... 250/208.1 |
| 8,687,174 | B2* | 4/2014 | Fossum et al. ............... 356/5.09 |
| 8,754,357 | B2* | 6/2014 | Meynants et al. ......... 250/214 R |
| 2009/0284731 | A1 | 11/2009 | Jin et al. |
| 2010/0020209 | A1* | 1/2010 | Kim ............................. 348/294 |
| 2010/0141821 | A1 | 6/2010 | Fossum et al. |
| 2010/0271517 | A1* | 10/2010 | De Wit et al. ................. 348/294 |
| 2011/0019025 | A1* | 1/2011 | Koseki ....................... 348/222.1 |
| 2011/0037969 | A1* | 2/2011 | Spickermann et al. ...... 356/5.01 |
| 2011/0163224 | A1* | 7/2011 | Atlas et al. ................. 250/208.1 |
| 2011/0242389 | A1* | 10/2011 | Takatsuka et al. ............ 348/311 |
| 2012/0193516 | A1* | 8/2012 | Bogaerts .................... 250/208.1 |

(Continued)

FOREIGN PATENT DOCUMENTS

| KR | 20090118795 A | 11/2009 |
| KR | 20100065434 A | 6/2010 |

*Primary Examiner* — John Lee
(74) *Attorney, Agent, or Firm* — Harness, Dickey & Pierce, P.L.C.

(57) ABSTRACT

In a method of operating an image sensor, a noise voltage of a floating diffusion region is sampled after a reset voltage is applied to the floating diffusion region. A storage region, in which a photo-charge is stored, is electrically connected to the floating diffusion region after sampling the noise voltage, and a demodulation voltage of the floating diffusion region is sampled after the storage region and the floating diffusion region are electrically-connected. A voltage is determined based on the noise voltage and the demodulation voltage.

17 Claims, 28 Drawing Sheets

(56) References Cited

U.S. PATENT DOCUMENTS

| | | | |
|---|---|---|---|
| 2012/0312967 A1* | 12/2012 | De Wit et al. | 250/214 A |
| 2013/0020463 A1* | 1/2013 | Lee et al. | 250/206 |
| 2013/0062522 A1* | 3/2013 | Jiang et al. | 250/338.4 |
| 2013/0120623 A1* | 5/2013 | Kim | 348/294 |
| 2014/0239161 A1* | 8/2014 | Meynants et al. | 250/214 SW |

* cited by examiner

|   |   |   |   |   |   |   |   |
|---|---|---|---|---|---|---|---|
| G | R | G | R | G | R | G | R |
| B | Z | B | Z | B | Z | B | Z |
| G | R | G | R | G | R | G | R |
| B | Z | B | Z | B | Z | B | Z |
| G | R | G | R | G | R | G | R |
| B | Z | B | Z | B | Z | B | Z |
| G | R | G | R | G | R | G | R |
| B | Z | B | Z | B | Z | B | Z |

105

FD1  SD1  BD1  PD1  CS  PD2  BD2  SD2  FD2

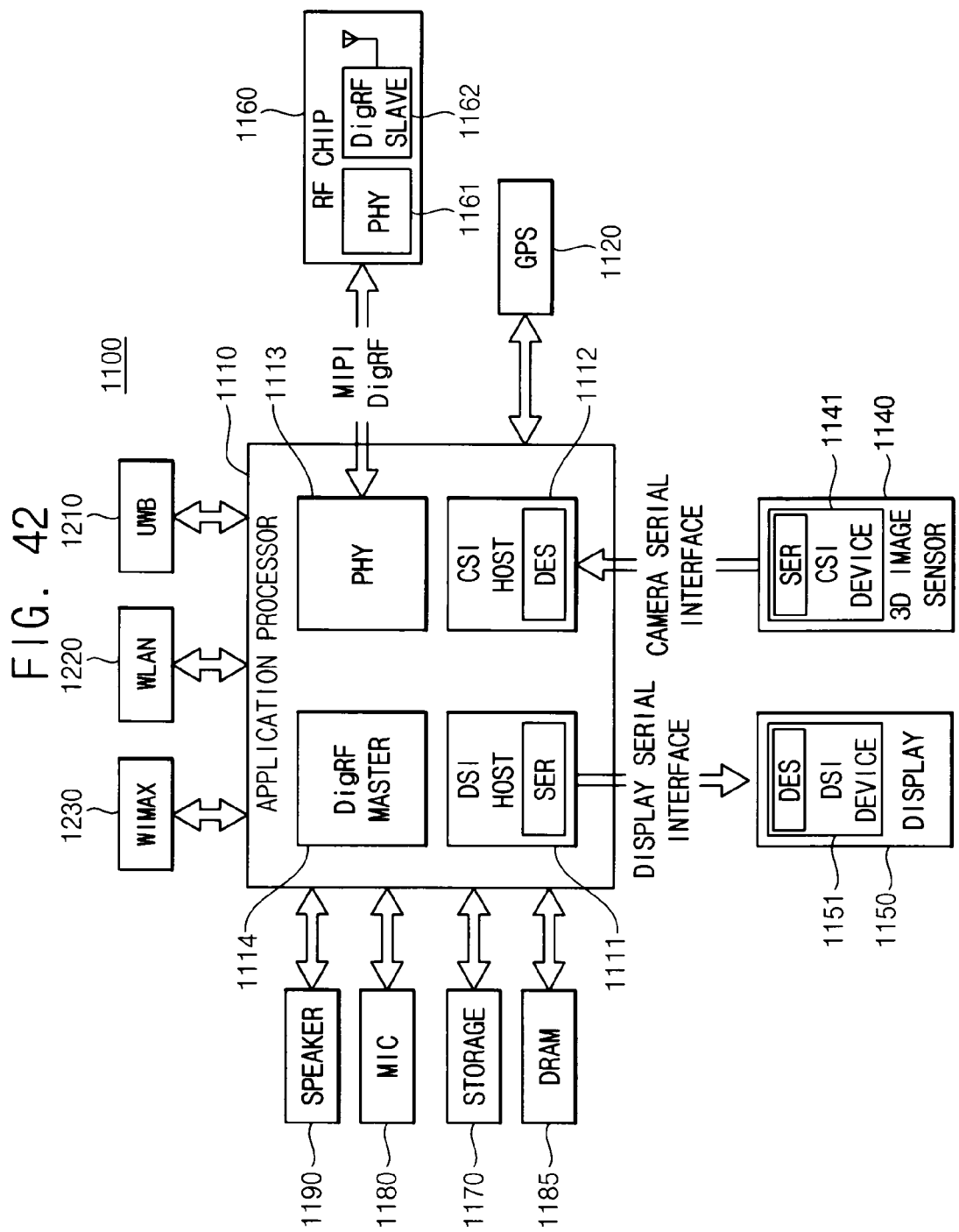

IMAGE-SENSING DEVICES AND METHODS OF OPERATING THE SAME

CROSS-REFERENCE TO RELATED APPLICATION

This application claims priority under 35 USC §119 to Korean Patent Application No. 10-2011-0072210, filed on Jul. 21, 2011, in the Korean Intellectual Property Office (KIPO), the contents of which are incorporated herein in its entirety by reference.

BACKGROUND

1. Technical Field

Example embodiments relate generally to photo-sensing devices, and more particularly to three-dimensional image sensors and/or methods of operating three-dimensional image sensors.

2. Description of the Related Art

A photo-sensing device such as an image sensor is configured to convert optical signals for providing image information and/or depth information of an object to electrical signals. Research and development is in progress to enhance the quality of the image captured by the image sensor such as a charge-coupled device (CCD) image sensor and a complementary metal oxide semiconductor (CMOS) image sensor. In more detail, research is in progress to improve performance of a three-dimensional image sensor for providing depth information or distance information representing a distance to an object in addition to the image information of the object.

A conventional three-dimensional image sensor uses an infrared light or a near-infrared light as transmission light to obtain the depth information. Compared with color pixels for obtaining image information, depth pixels have relatively low sensitivity and signal-to-noise ratio (SNR), and thus, it is relatively difficult to obtain accurate depth information.

SUMMARY

At least some example embodiments provide methods of measuring distances using photo-sensing devices capable of more efficiently suppressing and/or removing noise to enhance sensitivity and signal-to-noise ratio (SNR) in obtaining depth information.

At least some example embodiments provide methods of operating photo-sensing devices and/or image sensors.

At least some example embodiments provide photo-sensing devices capable of more efficiently suppressing and/or removing noise to enhance sensitivity and SNR in obtaining depth information.

According to at least one example embodiment, in a method of operating a photo-sensing device including at least one depth pixel, an object is illuminated with modulated transmission light. A photo-charge is stored in a storage region of the depth pixel in response to a demodulation signal, wherein the photo-charge is generated in a photo-detection region of the depth pixel by light reflected by the object. A noise voltage of a floating diffusion region of the depth pixel is sampled after a reset voltage is applied to the floating diffusion region. The storage region and the floating diffusion region are electrically-connected after the noise voltage is sampled. A demodulation voltage of the floating diffusion region is sampled after the storage region and the floating diffusion region are electrically-connected. A valid voltage corresponding to a phase of the demodulation signal is determined based on the noise voltage and the demodulation voltage.

In at least some example embodiments, the reset voltage may be applied to the floating diffusion region after the photo-charge is stored in the storage region. In at least some other example embodiments, the reset voltage may be applied to the floating diffusion region continuously while the photo-charge is stored in the storage region.

According to at least some example embodiments, the storing the photo-charge in the storage region in response to the demodulation signal may include: storing the photo-charge in a bridge diffusion node in response to the demodulation signal, wherein the bridge diffusion node is adjacent to the photo-detection region. The bridge diffusion node and the floating diffusion region may be electrically-connected after the noise voltage is sampled, and then the demodulation voltage may be sampled.

According to at least some example embodiments, the storing the photo-charge in the storage region in response to the demodulation signal may include: storing the photo-charge in a storage node in response to the demodulation signal, wherein the storage node is spaced apart from the photo-detection region. The storage node and the floating diffusion region may be electrically-connected after the noise voltage is sampled, and then the demodulation voltage may be sampled.

According to at least some example embodiments, the storing the photo-charge in the storage region in response to the demodulation signal may include: storing the photo-charge in a bridge diffusion node in response to the demodulation signal, the bridge diffusion node being adjacent to the photo-detection region; and electrically connecting the bridge diffusion node and a storage node, the storage node being spaced apart from the bridge diffusion node. The storage node and the floating diffusion region may be electrically-connected after the noise voltage is sampled, and then the demodulation voltage may be sampled.

In at least some example embodiments, the depth pixel may include a plurality of floating diffusion regions. A plurality of demodulation voltages of the plurality of floating diffusion regions may be sampled in response to a plurality of demodulation signals having phases different from each other.

In at least some other example embodiments, the depth pixel may include a common floating diffusion region. In this example, a plurality of demodulation voltages may be sampled in response to a plurality of demodulation signals having phases different from each other.

According to at least one other example embodiment, a photo-sensing device includes a light source, a sensing circuit (or unit) and a control circuit (or unit). The light source generates modulated transmission light to illuminate an object with the modulated transmission light. The sensing circuit includes at least one depth pixel, and the depth pixel includes a photo-detection region, a storage region, a transfer gate and a floating diffusion region. The control circuit is configured to control the light source and the sensing circuit. The photo-sensing device is configured to: store a photo-charge in the storage region in response to a demodulation signal, the photo-charge being generated in the photo-detection region by a reception light reflected by the object; sample a noise voltage at the floating diffusion region after a reset voltage is applied to the floating diffusion region in response to a reset signal; electrically-connect the storage region and the floating diffusion region in response to a transfer control signal applied to the transfer gate after the noise voltage is sampled; sample a demodulation voltage at the floating diffusion region after the storage region and the floating diffusion region are electrically-connected; and determine a voltage corresponding to a phase of the demodulation signal based on the noise voltage and the demodulation voltage.

The control circuit may generate the reset signal such that the reset signal is activated after the demodulation signal is deactivated, but deactivated before the transfer control signal is activated.

The control circuit may generate the reset signal such that the reset signal is activated continuously while the demodulation signal is activated, but deactivated before the transfer control signal is activated.

The storage region may include a bridge diffusion node that is adjacent to the photo-detection region, and the depth pixel may further include a photo gate disposed over the photo-detection region, where the photo gate is configured to store the photo-charge in the bridge diffusion node in response to the demodulation signal.

The storage region may include a storage node that is spaced apart from the photo-detection region, and the depth pixel may further include a collection gate configured to electrically connect the storage node and the photo-detection region in response to the demodulation signal.

The storage region may include a bridge diffusion node and a storage node, where the bridge diffusion node is adjacent to the photo-detection region and the storage node is spaced apart from the bridge diffusion node, and the depth pixel may further include a photo gate and a storage gate. The photo gate may be disposed over the photo-detection region, the photo gate may be configured to store the photo-charge in the bridge diffusion node in response to the demodulation signal, and the storage gate may be configured to electrically connect the storage node and the bridge diffusion node.

The depth pixel may include a plurality of floating diffusion regions. The photo-sensing device may be configured to sample a plurality of demodulation voltages of the plurality of diffusion regions in response to a plurality of demodulation signals having phases different from each other.

The depth pixel may include a common floating diffusion region. The photo-sensing device may be configured to sequentially sample a plurality of demodulation voltages in response to a plurality of demodulation signals having phases different from each other.

The common floating diffusion region may be disposed at a center portion of the depth pixel. The storage region may have a ring shape to surround the common floating diffusion region and the photo-detection region has a ring shape to surround the storage region.

The storage region may include a ring-shaped bridge diffusion node that is adjacent to an inner surface of the photo-detection region, and the depth pixel may further include a ring-shaped photo gate disposed over the photo-detection region. The ring-shaped photo gate may be configured to store the photo-charge in the ring-shaped bridge diffusion node in response to the demodulation signal.

The storage region may include a ring-shaped storage node that is spaced apart from an inner surface of the photo-detection region, and the depth pixel may further include a ring-shaped collection gate configured to electrically connect the ring-shaped storage node and the photo-detection region in response to the demodulation signal.

The storage region may include a ring-shaped bridge diffusion node and a ring-shaped storage node, where the ring-shaped bridge diffusion node is adjacent to an inner surface of the photo-detection region and the ring-shaped storage node is spaced apart from an inner surface of the ring-shaped bridge diffusion node. The depth pixel may further include a ring-shaped photo gate and a ring-shaped storage gate, the ring-shaped photo gate being disposed over the photo-detection region. The ring-shaped photo gate may be configured to store the photo-charge in the ring-shaped bridge diffusion node in response to the demodulation signal, and the ring-shaped storage gate may be configured to electrically connect the ring-shaped storage node and the ring-shaped bridge diffusion node.

The ring-shaped photo-detection region may include a first photo-detection portion and a second photo-detection portion electrically separated from each other. The first photo-detection portion may collect a first photo-charge corresponding to a first demodulation signal having a phase equal or substantially equal to a phase of the modulated transmission light, and the second photo-detection portion may collect a second photo-charge corresponding to a second demodulation signal having a phase opposite to the phase of the modulated transmission light. The ring-shaped storage region may be divided into a first storage portion and a second storage portion, which are electrically separated from each other. The first storage portion may store the first photo-charge collected in the first photo-detection segment and the second storage portion may store the second photo-charge collected in the second photo-detection segment.

At least one other example embodiment provides a method of operating a photo-sensing device including at least one depth pixel, the at least one depth pixel including a storage region and a floating diffusion region. According to at least this example embodiment, the method includes: first sampling a noise voltage at the floating diffusion region; second sampling a demodulation voltage at the floating diffusion region after first sampling the noise voltage, the demodulation voltage corresponding to a photo-charge stored in the storage region, the photo-charge being generated based on light incident on the at least one depth pixel; and determining a voltage corresponding to a phase of a demodulation signal based on the sampled noise voltage and the sampled demodulation voltage.

According to at least some example embodiments, the method may further include: electrically connecting the storage region with the floating diffusion region after the first sampling, but before the second sampling.

According to at least some example embodiments, the method may include: applying a reset voltage to the floating diffusion region prior to the first sampling of the noise voltage. The reset voltage may be applied to the floating diffusion region one of: (i) after the photo-charge is stored in the storage region; and (ii) continuously while the photo-charge is stored in the storage region.

According to at least some example embodiments, the method may further include: illuminating an object with modulated transmission light; and storing the photo-charge in the storage region in response to a demodulation signal, the photo-charge being generated in a photo-detection region of the depth pixel by light reflected by the object.

According to at least some example embodiments, the photo-charge may be stored in a bridge diffusion node in response to the demodulation signal, the bridge diffusion node being adjacent to the photo-detection region.

According to at least some example embodiments, the photo-charge may be stored in a storage node in response to the demodulation signal, the storage node being spaced apart from the photo-detection region.

BRIEF DESCRIPTION OF THE DRAWINGS

Illustrative, non-limiting example embodiments will be more clearly understood from the following detailed description taken in conjunction with the accompanying drawings.

FIG. 9 is a diagram illustrating an example embodiment of a pixel array in the photo-sensing device of FIG. 8.

FIG. 42 illustrates a block diagram of an example embodiment of an interface employable in the computing system of FIG. 41.

DETAILED DESCRIPTION

Figure 1:
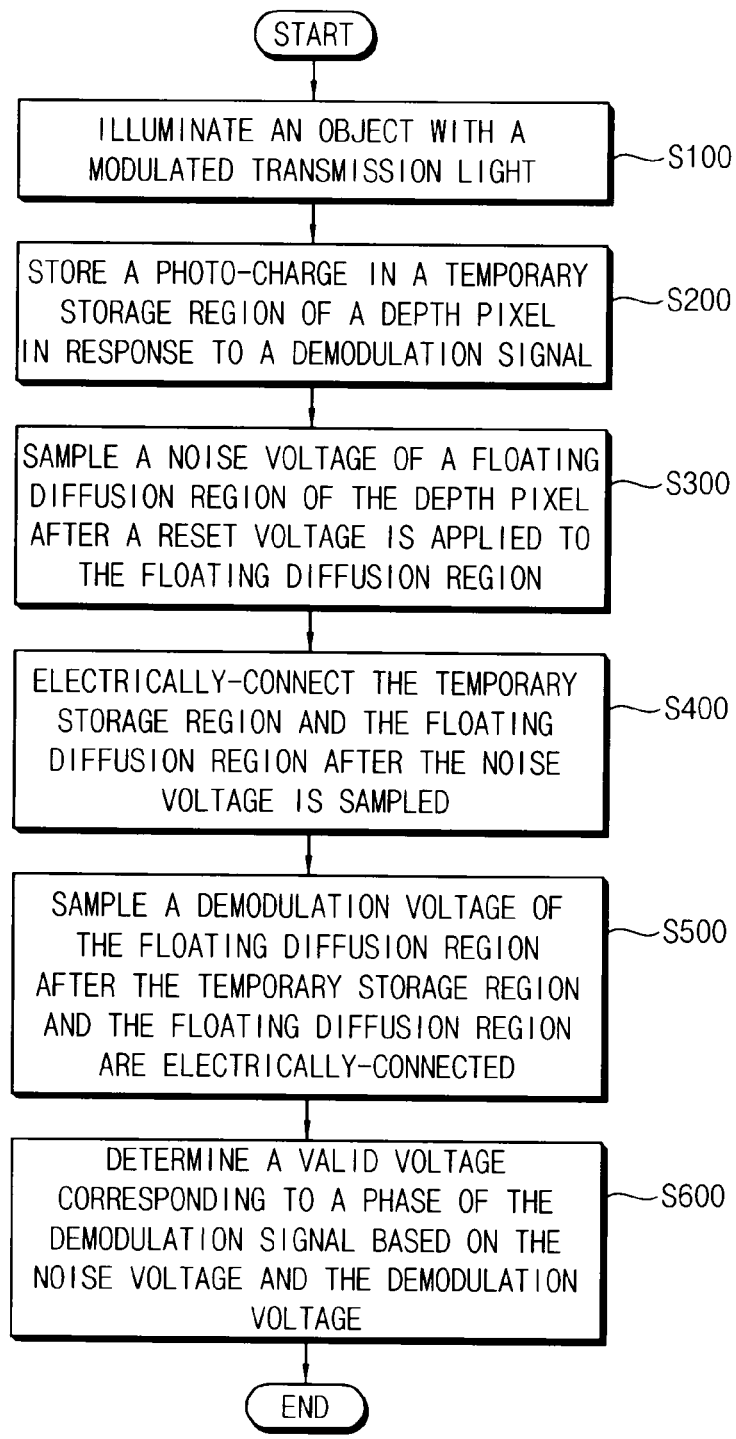
FIG. 1 is a flowchart illustrating a method of operating a photo-sensing device including at least one depth pixel according to an example embodiment.

Various example embodiments will be described more fully hereinafter with reference to the accompanying drawings, in which some example embodiments are shown. The present inventive concepts may, however, be embodied in many different forms and should not be construed as limited to the example embodiments set forth herein. Rather, these example embodiments are provided so that this disclosure will be thorough and complete, and will fully convey the scope of the present inventive concepts to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flowchart illustrating a method of operating a photo-sensing device including at least one depth pixel according to an example embodiment.

Referring to FIG. 1, the object is illuminated with a modulated transmission light (block S100) from the photo-sensing device. A photo-charge is stored in a temporary storage region of the depth pixel in response to a demodulation signal (block S200), where the photo-charge is generated in a photo-detection region of the depth pixel by light reflected by the object. A noise voltage of a floating diffusion region of the depth pixel is sampled after a reset voltage is applied to the floating diffusion region (block S300). The temporary storage region and the floating diffusion region are electrically connected to each other after the noise voltage is sampled (block S400). A demodulation voltage of the floating diffusion region is sampled after the temporary storage region and the floating diffusion region are electrically-connected (block S500). A valid voltage corresponding to a phase of the demodulation signal is determined based on the noise voltage and the demodulation voltage (block S600). For example, the valid voltage may be determined as the difference between the noise voltage and the demodulation voltage.

The respective processes of the above-described method may be variously changed depending on the structure of the depth pixel and/or the temporary storage region of the depth pixel, which will be described with reference to FIGS. 10 through 36.

In methods (e.g., for determining distance to an object) according to example embodiments, the photo-charge is stored in the temporary storage region such as a bridge diffusion node and/or a storage node so that the noise voltage may be sampled before the demodulation voltage is sampled. Thus, a more precise valid voltage may be determined by enhancing the signal-to-noise ratio (SNR).

Figure 2:
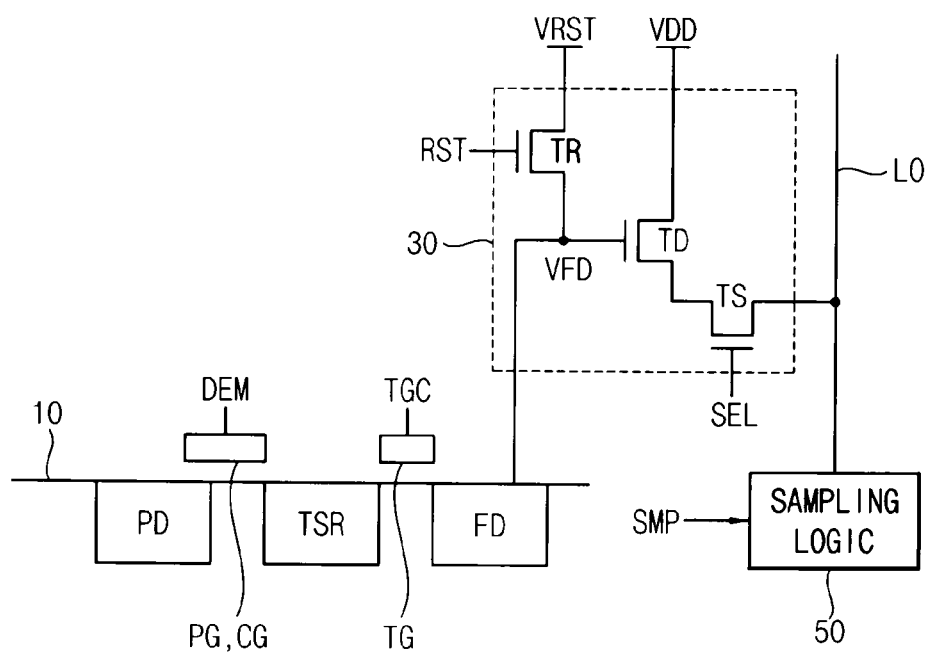
FIG. 2 is a schematic diagram of a photo-sensing device for describing the method shown in FIG. 1.

FIG. 2 is a schematic diagram of an example embodiment of a photo-sensing device for describing the method shown in FIG. 1.

Referring to FIG. 2, a photo-sensing device detects a photo-charge using a photo-detection region PD, a temporary storage region TSR and a floating diffusion region FD, which are formed in a semiconductor substrate 10, and converts the detected photo-charge to an electrical signal using a readout circuit 30, which are integrated based on the semiconductor substrate.

As will be described below, the photo-charge generated in the photo-detection region PD may be stored in the temporary storage region TSR in response to a demodulation signal DEM that are applied to a photo gate PG of FIG. 10 or a collection gate CG of FIG. 13. The temporary storage region TSR and the floating diffusion region FD may be electrically connected to each other in response to a transfer control signal TGC applied to a transfer gate TG. Such electrical connection may be a channel formed near the upper surface portion of the semiconductor substrate between the two regions.

A floating diffusion region voltage VFD may be converted to the corresponding signal by the readout circuit 30 and transferred to an output line LO. The readout circuit 30 may include a source follower transistor TD, a select transistor TS and a reset transistor TR. The reset transistor TR may initialize the floating diffusion region voltage VFD to a reset voltage VRST in response to a reset signal RST. The floating diffusion region FD is coupled to a gate of the source follower transistor TD. If the select transistor TS is turned on in response to a select signal SEL, the electrical signal corresponding to the floating diffusion region voltage VFD is provided to another circuit such as a sampling logic 50 via the output line LO.

The sampling logic 50 may sample the electrical signal on the output line LO in response to a sampling control signal SMP. The noise voltage and the demodulation voltage may be sampled by controlling the timing of the sampling control signal SMP.

Figure 3:
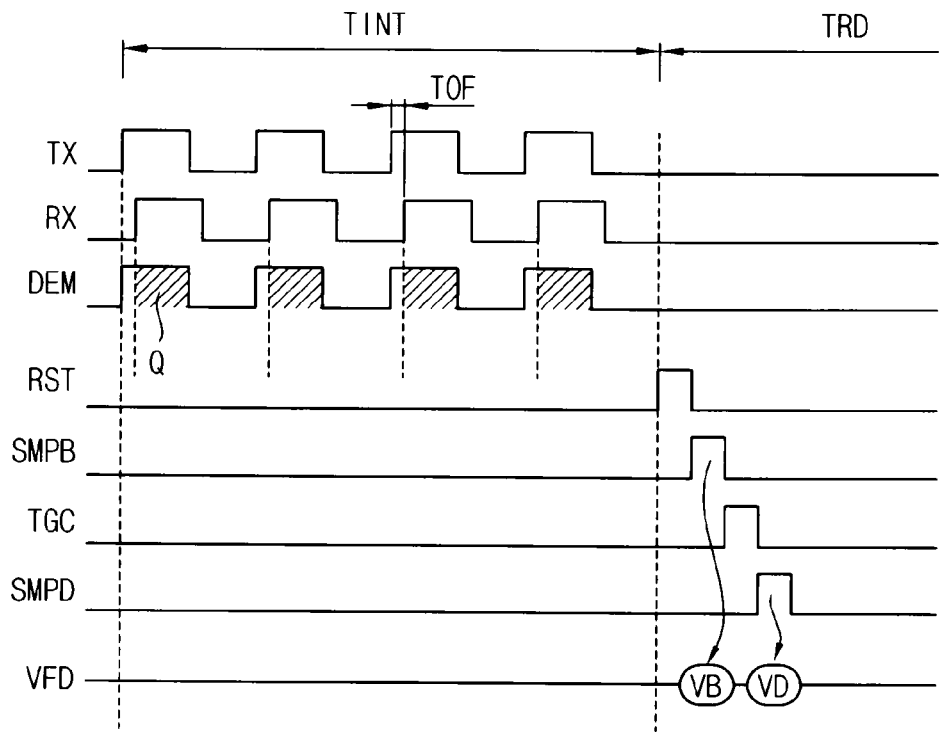
FIG. 3 is a timing diagram illustrating a method of operating a photo-sensing device according to an example embodiment.

FIG. 3 is an example timing diagram illustrating a method of operating a photo-sensing device according to an example embodiment.

Figure 7:
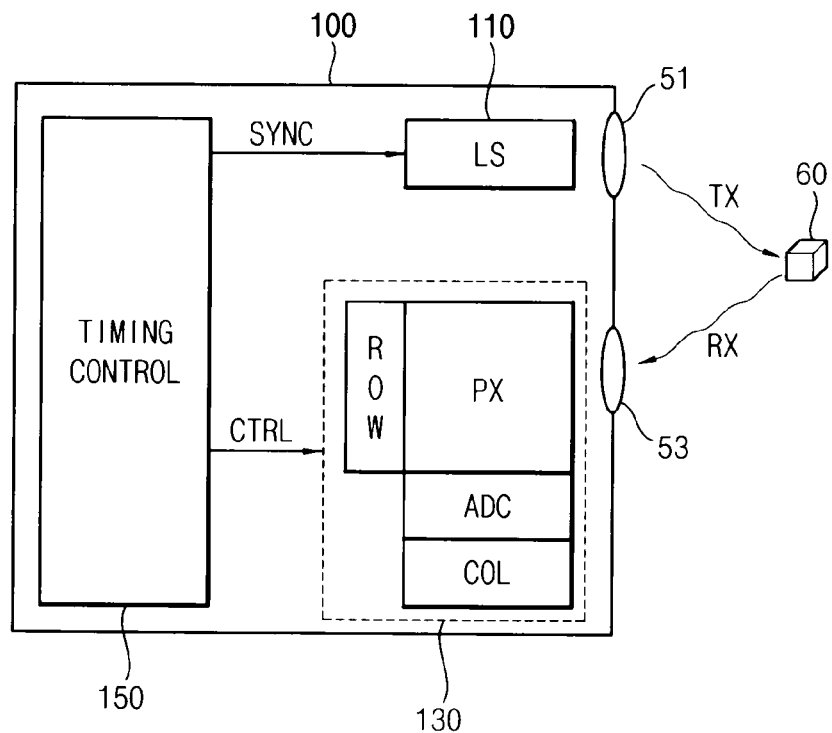
FIG. 7 is a block diagram illustrating a photo-sensing device according to an example embodiment.

Referring to FIG. 3, an object is illuminated with a modulated transmission light TX during an integration time interval TINT as illustrated in FIG. 7. The photo-sensing device may include a light source or a light-emitting device to generate the modulated transmission light TX having periodically varying intensity. For example, the photo-sensing device may repeat the transmission and non-transmission of the modulated transmission light TX by turning on or off the light-emitting device at a frequency ranging from about 10 MHz to about 200 MHz. Even though FIG. 3 illustrates the modulated transmission light TX of a pulse train, arbitrary periodic light signal such as a sinusoidal signal may be used as the modulated transmission light TX.

The modulated transmission light TX is reflected by the object and returned to the photo-sensing device as a reception light RX. The reception light RX is delayed by a time of flight (TOF) with respect to the modulated transmission light TX. The photo-charge is generated in the photo-detection region of the depth pixel by the reception light RX.

The demodulation signal DEM may have a given, desired or predetermined phase with respect to the modulated transmission light TX. The photo-charge Q during the activation interval of the demodulation signal DEM may be stored in the temporary storage region TSR. The TOF may be obtained by measuring the photo-charge Q corresponding to the phase of the demodulation signal DEM. When the distance from the photo-sensing device to the object is D and a light velocity is c, the distance may be calculated using the relation D=(TOF*c)/2. Even though FIG. 3 illustrates the one demodulation signal DEM, a plurality of demodulation signals having different phases may be used to obtain more exact TOF. For example, as will be described below, the photo-sensing device may use a first demodulation signal DEM1 having a phase equal to a phase of the modulated transmission light TX and a second a second demodulation signal DEM2 having a phase opposite to the phase of the modulated transmission light TX. Also three or more demodulation signals may be used according to example embodiments. The reset signal RST and the transfer control signal TGC are maintained in a deactivated state during the integration time interval TINT. Even though not illustrated in FIG. 3, the photo-detection region PD, the temporary storage region TSR and the floating diffusion region FD may be initialized by activating the reset signal RST and the transfer control signal TGC before the integration time interval TINT.

During a readout time interval TRD, the reset signal RST is activated to apply the reset voltage VRST to the floating diffusion region FD. FIG. 3 illustrates an example embodiment in which the reset voltage VRST is applied to the floating diffusion region FD after the photo-charge is stored in the temporary storage region TSR. A first sampling control signal SMPB is activated after the reset voltage VRST is applied to the floating diffusion node FD, and then the reset floating diffusion region voltage VFD is sampled as the noise voltage VB. The temporary storage region TSR and the floating diffusion region FD are electrically connected to each other after the noise voltage VB is sampled, and then a second sampling control signal SMPD is activated to sample the floating diffusion region voltage VFD as the demodulation voltage VD. The difference between the noise voltage VB and the demodulation voltage VD may be determined as the valid voltage corresponding to the phase of the demodulation signal.

As such, noise voltage VB corresponding to the noise in the floating diffusion region FD may be sampled before the demodulation voltage VD is sampled, thereby enhancing the SNR to obtain the more accurate valid voltage.

Figure 4:
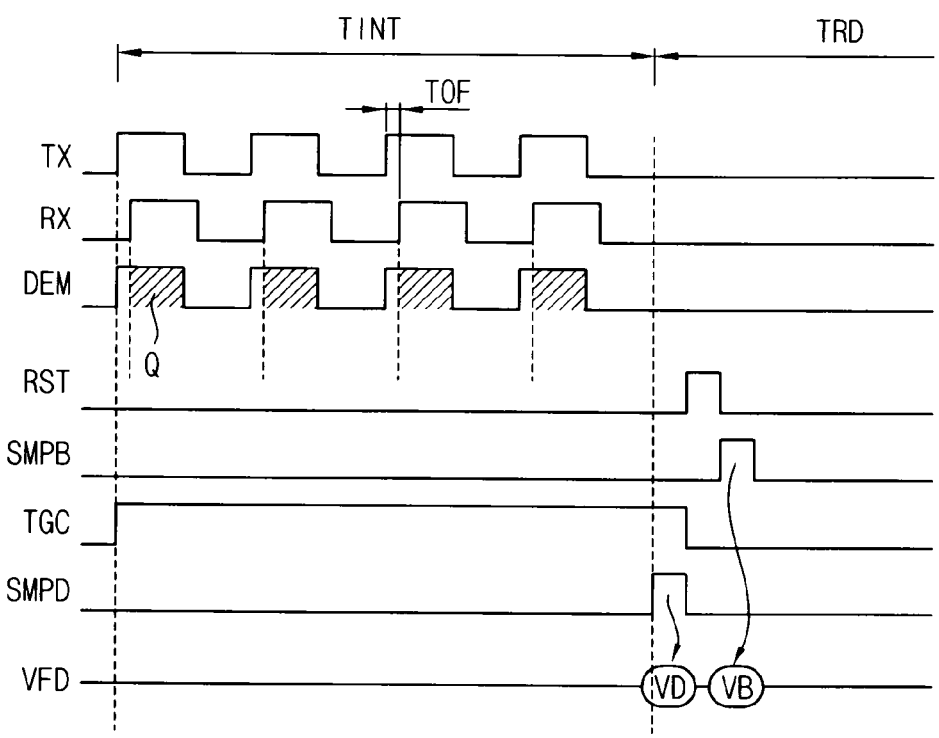
FIG. 4 is an example timing diagram illustrating a method of operating a photo-sensing device according to a three-transistor operation.

FIG. 4 is an example timing diagram illustrating a method of operating a photo-sensing device according to a three-transistor operation.

FIG. 4 illustrates the three-transistor operation in which the photo-charge generated in the photo-detection region PD is directly stored in the floating diffusion region FD by activating the transfer control signal TGC during the integration time interval TINT.

During the readout time interval TRD, the second sampling control signal SMPD is activated firstly to sample the demodulation voltage VD. Then the reset signal RST is activated to apply the reset voltage VRST to the floating diffusion region FD and the first sampling control signal SMPB is activated to sample the noise voltage VB.

The voltages VB and VD sampled by the three-transistor operation may not reflect the exact noise component. The depth pixel for sensing the infrared light or the near-infrared light requires a relatively long integration time interval since the depth pixel has the lower sensitivity than the color pixel. The noises due to various causes may be induced in the floating diffusion region FD during the long integration time interval, and the noise voltage VB sampled after the demodulation voltage VD may not reflect the noises associated with the previously sampled demodulation voltage VD.

In contrast, noise voltage VB corresponding to the noise in the floating diffusion region FD may be sampled before the demodulation voltage VD is sampled according to example embodiments, thereby enhancing the SNR to obtain the more accurate valid voltage.

Figure 5:
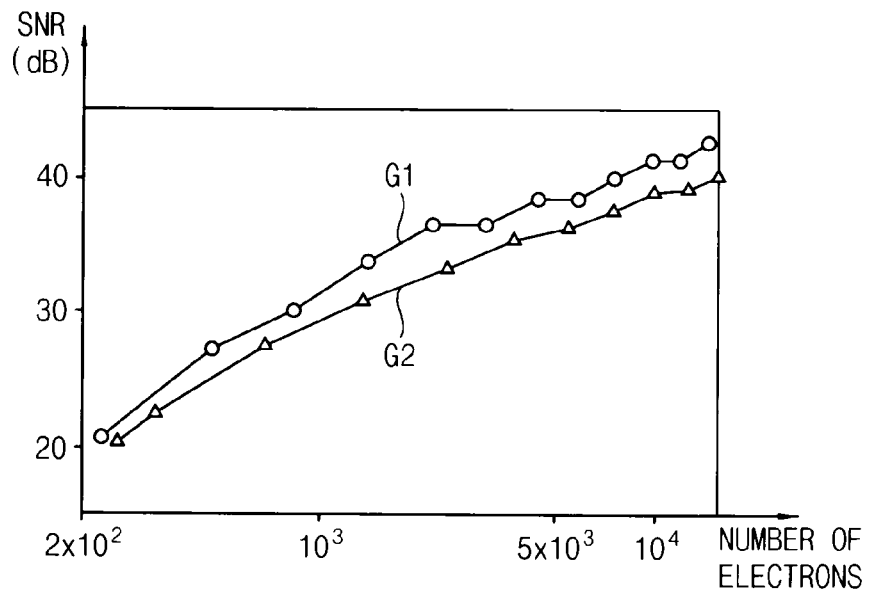
FIG. 5 is a diagram illustrating example signal-to-noise ratios (SNRs) according to the methods of FIGS. 3 and 4.

FIG. 5 is a diagram illustrating signal-to-noise ratios (SNRs) according to the methods of FIGS. 3 and 4.

In FIG. 5, the vertical axis indicates the SNR in unit of dB and the horizontal axis indicates the number of photo-electrons corresponding to the demodulation voltage VD. The first graph G1 represented by the small circles indicates the case of FIG. 3, in which the demodulation voltage VD is sampled after the noise voltage VB is sampled, using the temporary storage region TSR. The second graph G2 represented by small triangles indicates the case of FIG. 4, in which the noise voltage VB is sampled after demodulation voltage VD is sampled according to three-transistor operation. FIG. 5 shows that the higher SNR may be obtained according to example embodiments.

Figure 6:
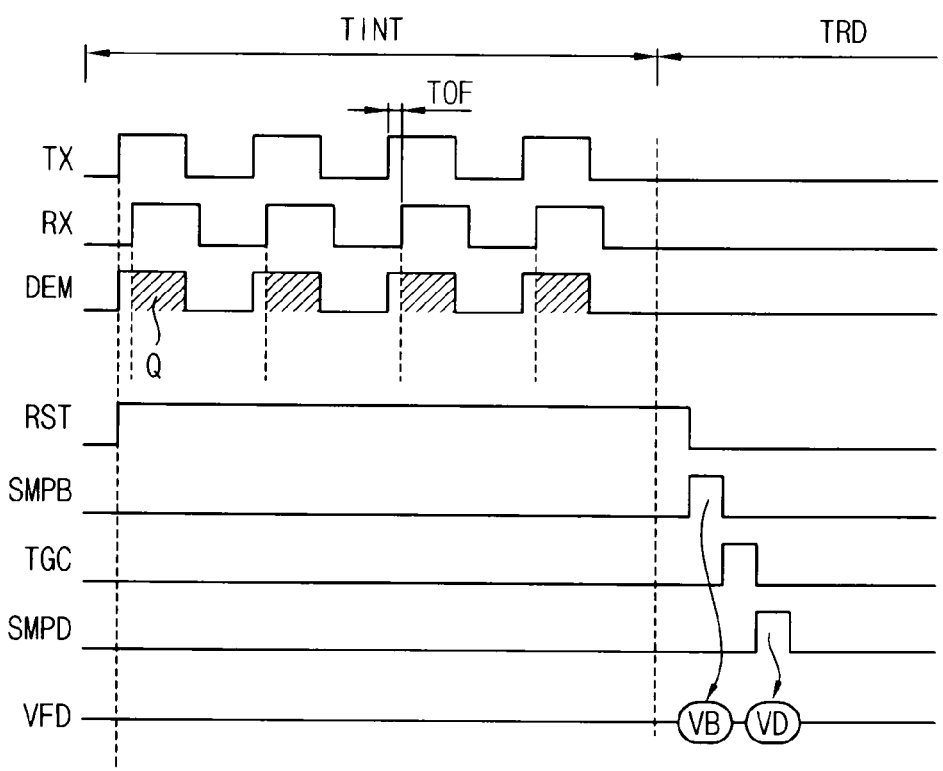
FIG. 6 is a timing diagram illustrating a method of operating a photo-sensing device according to an example embodiment.

FIG. 6 is an example timing diagram illustrating a method of operating a photo-sensing device according to an example embodiment.

The method of FIG. 6 is similar to the method of FIG. 3, and the repeated descriptions are omitted.

Referring to FIG. 6, the reset signal RST may be activated continuously during the integration time interval TINT while the photo-charge is stored in the temporary storage region TSR. In this case, the floating diffusion region FD may be stabilized at the reset voltage VRST during the integration time interval TINT, and thus reliability of the noise voltage VB sampled after the integration time interval TINT may be further enhanced.

FIG. 7 is a block diagram illustrating a photo-sensing device according to an example embodiment.

Referring to FIG. 7, the photo-sensing device 100 may include a light source LS 110, a sensing unit 130 and a control unit 150. The light source 110 generates a modulated transmission light TX to illuminate an object with the modulated transmission light TX. The control unit 150 generates control signals SYNC and CTRL to control operations of the light source 110 and the sensing unit 130. The sensing unit 130 may include at least one depth pixel that converts reception light RX to an electrical signal. The depth pixel may include the photo-detection region PD, the temporary storage region TSR and the floating diffusion region FD as illustrated in FIG. 2. The depth pixel may be implemented in various ways, as will be described with reference to FIGS. 10 through 36.

The light source 110 may emit the modulated transmission light TX having a given, desired or predetermined wavelength. For example, the light source 110 may emit infrared light or near-infrared light. The emitted light TX generated by the light source 110 may be focused on the object 60 by a lens 51. The light source 110 may be controlled by the control signal SYNC to output the modulated transmission light TX such that the intensity of the modulated transmission light TX periodically changes. For example, the light source 110 may be implemented with a light emitting diode (LED), a laser diode, or the like.

The control signal SYNC from the control unit 150 may include the above-mentioned reset signal RST, the demodulation signal DEM, the transfer control signal TGC, and the sampling control signals SMPB and SMPD. The control signal SYNC provided to the light source 100 may include a signal to synchronize the modulated transmission light TX and the demodulation signal DEM. In an example embodiment, the control unit 150 may generate the reset signal RST such that the reset signal RST may be activated after the demodulation signal DEM is deactivated and the reset signal RST is deactivated before the transfer control signal TGC is activated. In another example embodiment, the control unit 150 may generate the reset signal RST such that the reset signal RST is activated continuously while the demodulation signal DEM is activated and the reset signal RST is deactivated before the transfer control signal TGC is activated.

For example, the photo-sensing device 100 may be a three-dimensional image sensor including the depth pixels for providing depth information in addition to the color pixels for providing image information. In case of the three-dimensional image sensor, the sensing unit 130 may include a pixel array PX in which color pixels and the depth pixels are arranged. Also the sensing unit 130 may include an analog-to-digital converting unit ADC and selection circuits ROW and COL to select a particular pixel in the pixel array PX.

In at least some example embodiments, the analog-to-digital converting unit ADC may perform column analog-to-digital conversion that converts analog signals in parallel using a plurality of analog-to-digital converters respectively coupled to a plurality of column lines, or may perform single analog-to-digital conversion that converts the analog signals in series using a single analog-to-digital converter.

In one or more example embodiments, the analog-to-digital converting unit ADC may include a correlated double sampling (CDS) unit for extracting an effective signal component (the valid voltage).

In at least some example embodiments, the CDS unit may perform analog double sampling (ADS) that extracts the effective signal component based on an analog reset signal that represents a reset component and an analog data signal that represents a signal component.

In at least some other example embodiments, the CDS unit may perform digital double sampling (DDS) that converts the analog reset signal and the analog data signal into two digital signals to extract as the effective signal component a difference between the two digital signals.

In still at least some other example embodiments, the CDS unit may perform dual correlated double sampling that performs both of analog double sampling and digital double sampling.

Referring again to FIGS. 1, 2, 3 and 7, the photo-sensing device 100 illuminates the object 60 with the modulated transmission light TX using the light source 110 (block S100). The photo-charge is generated in the photo-detection region PD of the depth pixel by the reception light RX reflected by the object 60. The photo-charge is stored in the temporary storage region TSR of the depth pixel in response to the demodulation signal DEM (block S200). The noise voltage VB of the floating diffusion region FD is sampled in response to the first sampling control signal SMPB after the reset voltage VRST is applied to the floating diffusion region FD in response to the reset signal RST (block S300). The temporary storage region TSR and the floating diffusion region FD are electrically connected in response to the transfer control signal TGC after the noise voltage VB is sampled (block S400). The demodulation voltage VD of the floating diffusion region FD is sampled in response to the second sampling control signal SMPD after the temporary storage region TSR and the floating diffusion region FD are electrically connected (block S500). The valid voltage corresponding to the phase of the demodulation signal DEM is determined based on the noise voltage VB and the demodulation voltage VD (block S600).

Figure 8:
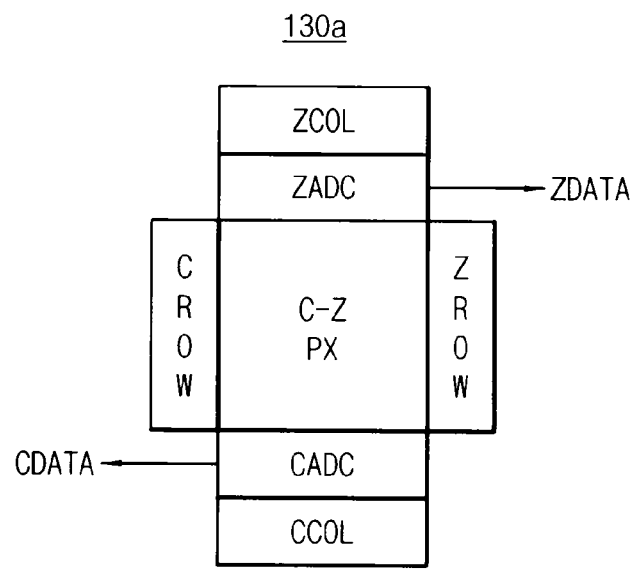
FIG. 8 is a diagram illustrating an example embodiment of a sensing unit in the photo-sensing device of FIG. 7.
Figure 30:
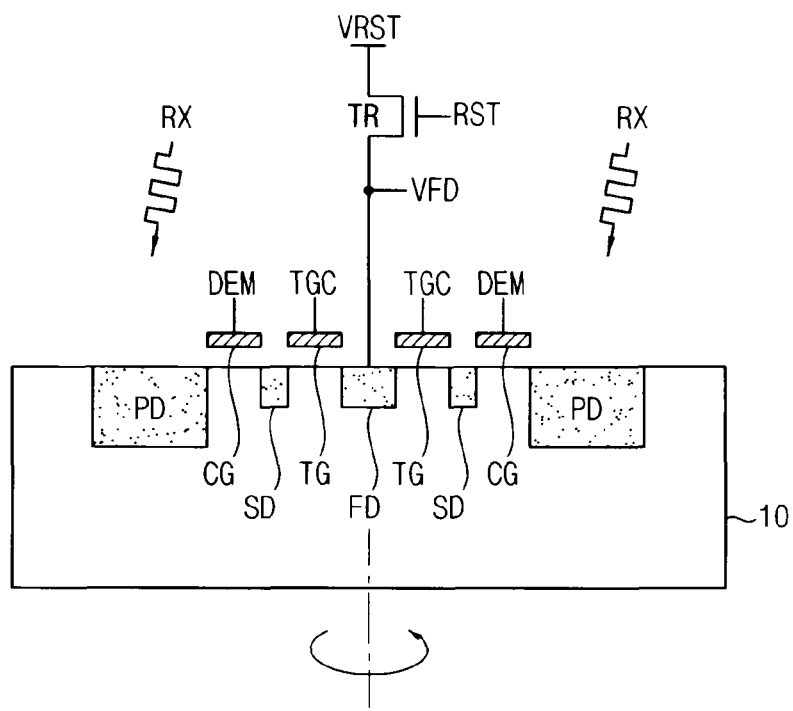
FIG. 30 is a cross-sectional diagram illustrating an example vertical structure of the depth pixel of FIG. 29.

FIG. 8 is a diagram illustrating an example embodiment of a sensing unit in the photo-sensing device of FIG. 7. FIG. 30 illustrates an example embodiment of a sensing unit 130 in a case where the photo-detection device 100 of FIG. 7 is a three-dimensional image sensor.

Referring to FIG. 8, the sensing unit 130a may include a pixel array C-Z PX where a plurality of color pixels and a plurality of depth pixels are arranged, a color pixel select circuit CROW and CCOL, a depth pixel select circuit ZROW and ZCOL, a color pixel converter CADC and a depth pixel converter ZADC. The color pixel select circuit CROW and CCOL and the color pixel converter CADC may provide image information CDATA by controlling the color pixels included in the pixel array C-Z PX, and the depth pixel select circuit ZROW and ZCOL and the depth pixel converter ZADC may provide depth information ZDATA by controlling the depth pixels included in the pixel array C-Z PX.

As such, in the three-dimensional image sensor, components for controlling the color pixels and components for controlling the depth pixels may independently operate to provide the color data CDATA and the depth data ZDATA of an image.

FIG. 9 is a diagram illustrating an example embodiment of a pixel array in the photo-sensing device of FIG. 8.

Referring to FIG. 9, the pixel array C-Z PX may include the color pixels R, G and B for providing image information and the depth pixels Z for providing depth information. For example, the pixel pattern 105 including the red pixel R, the green pixel G, the blue pixel B and the depth pixel Z may be repeatedly arranged in the pixel array C-Z PX.

Each of the color pixels R, G and B may include a photo-detection region for collecting photo-electrons generated by the incident visible light, and the depth pixel Z may include a photo-detection region for collecting photo-electrons generated by the reception light RX, that is, the incident infrared light or near-infrared light. For example, to enhance quantum efficiency, the depth pixel Z may include a photodiode formed deeper than that of the color pixel R, G and B since the infrared light has a longer wavelength than that of the visible light.

Color filters may be formed over the color pixels R, G and B and the infrared light filters may be formed over the depth pixels Z. For example, the red pixel R may be defined by the red filter, the green pixel may be defined by the green filter, the blue pixel B may be defined by the blue filter and the depth pixel may be defined by the infrared light pass filter. In addition, infrared light cut filters may be further formed over the color pixels R, G and B.

FIG. 9 illustrates a non-limiting example of the pixel pattern 105, and the pixel pattern 105 may be changed variously. For example, the area ratio of the one color pixel and the one depth pixel may be changed variously and/or the number ratio of the color pixels and the depth pixels in the pixel array C-Z PX may be changed variously.

Hereinafter, various depth pixels for performing the method of measuring the distance according to example embodiments are described with reference to FIGS. 10 through 36. FIGS. 10 through 17 illustrate example embodiments in which one depth pixel includes a plurality of floating diffusion regions to sample a plurality of demodulation voltages in response to a plurality of demodulation signals having phases different from each other. FIGS. 18 through 25 illustrate example embodiments in which one depth pixel includes one floating diffusion region to sequentially sample a plurality of demodulation voltages in response to a plurality of demodulation signals having phases different from each other. FIGS. 26 through 33 illustrate example embodiments in which the depth pixel has a ring shape centered on the floating diffusion region.

Figure 10:
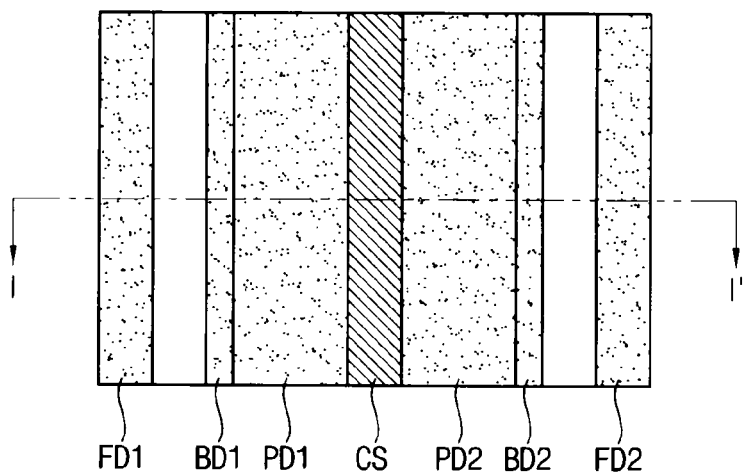
FIG. 10 is a diagram illustrating a layout of a depth pixel including a plurality of floating diffusion regions and a bridge diffusion node according to an example embodiment.
Figure 11:
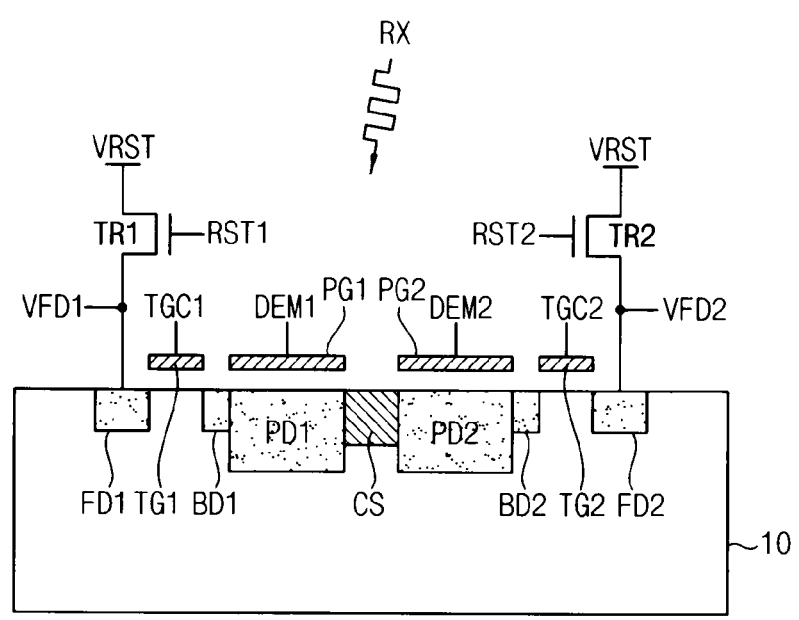
FIG. 11 is a cross-sectional diagram illustrating an example vertical structure of the depth pixel of FIG. 10.

FIG. 10 is a diagram illustrating a layout of a depth pixel including a plurality of floating diffusion regions and a bridge diffusion node according to example embodiment. FIG. 11 is a cross-sectional diagram illustrating an example vertical structure of the depth pixel taken along the line I-I' of FIG. 10.

Referring to FIGS. 10 and 11, the depth pixel Z1 may include a first photo-detection region PD1, a second photo-detection region PD2, a channel stop region CS, a first bridge diffusion node BD1, a second bridge diffusion node BD2, a first floating diffusion region FD1 and a second floating diffusion region FD2, which are formed in a semiconductor substrate 10. In addition, the depth pixel Z1 may include a first photo gate PG1, a second photo gate PG2, a first transfer gate TG1 and a second transfer gate TG2, which are formed over the semiconductor substrate 10.

The depth pixel Z1 may be formed through the complementary metal-oxide-silicon (CMOS) processes based on the semiconductor substrate 10. For example, the first photo-detection region PD1, the second photo-detection region PD2, the channel stop region CS, the first bridge diffusion node BD1, the second bridge diffusion node BD2, the first floating diffusion region FD1 and the second floating diffusion region FD2 may be formed using, for example, an ion implantation process or the like. The first photo gate PG1, the second photo gate PG2, the first transfer gate TG1 and the second transfer gate TG2 may be formed over the semiconductor substrate 10 using a deposition process, an etch process, etc. Although it is not illustrated, an insulation layer, such as an oxide layer, may be formed between the upper surface of the semiconductor substrate 10 and the gates PG1, PG2, TG1 and TG2.

The gates PG1, PG2, TG1 and TG2 may include polysilicon or transparent conducting oxide (TCO). For example, the gates PG1, PG2, TG1 and TG2 may include indium tin oxide (ITO), indium zinc oxide (IZO), zinc oxide (ZnO), titanium dioxide ($TiO_2$), etc.

More particularly in one or more example embodiments in which the reception light RX incident on the depth pixel Z1 passes through the upper surface of the semiconductor substrate 10 as illustrated in FIG. 11, the photo gates PG1 and PG2 may include TCO. In one or more example embodiments in which the reception light incident on the depth pixel Z1 passes through the bottom surface of the semiconductor substrate 10, the gates PG1, PG2, TG1 and TG2 may include non-transparent conducting oxide.

The photo-detection regions PD1 and PD2 may be doped with impurities of an opposite conductivity type to that of the semiconductor substrate 10. For example, photo-detection regions PD1 and PD2 may be doped with impurities of the N-type when the semiconductor substrate 10 is the P-type. In this case, the channel stop region CS may be relatively highly doped with the impurities of the P-type. In contrast, the photo-detection regions PD1 and PD2 may be doped with impurities of the P-type when the semiconductor substrate 10 is the N-type or includes an N-type well.

The depth pixel Z1 includes the plurality of floating diffusion regions FD1 and FD2 to sample a plurality of demodulation voltages VD1 and VD2 in response to a plurality of demodulation signals DEM1 and DEM2 having phases different from each other. For example, the depth pixel Z1 may include the two floating diffusion regions FD1 and FD2 as illustrated in FIGS. 10 and 11 to form two half pixels divided by the channel stop region CS.

The channel stop region CS may be formed in the semiconductor substrate 10 between the two photo gates PG1 and PG2 to suppress and/or prevent charge transfer between the two photo-detection regions PD1 and PD2. The noises due to the charge transfer may be reduced by forming the channel stop region CS to form a potential wall between the two photo gates PG1 and PG2.

The bridge diffusion nodes BD1 and BD2 corresponding to the temporary storage region TSR are formed adjacent to the photo-detection regions PD1 and PD2, respectively. The photo gates PG1 and PG2 are formed over the photo-detection regions PD1 and PD2 and the photo-charges are stored in the bridge diffusion nodes BD1 and BD2 in response to the demodulation signals DEM1 and DEM2 applied to the photo gates PG1 and PG2. That is, for example, the photo-charges corresponding to the phases of the demodulation signals DEM1 and DEM2 are stored in the bridge diffusion nodes BD1 and BD2, respectively. The channels are formed in the upper surface portions of the semiconductor substrate 10 in response to the transfer control signals TGC1 and TGC2, and the bridge diffusion nodes BD1 and BD2 and the floating diffusion regions FD1 and FD2 may be electrically connected through the formed channels. The reset voltage VRST may be applied to the floating diffusion regions FD1 and FD2 in response to the reset signals RST1 and RST2. The floating diffusion region voltages VFD1 and VFD2 may be sampled as the noise voltage VB1 and VB2 and the demodulation voltage VD1 and VD2.

Figure 12:
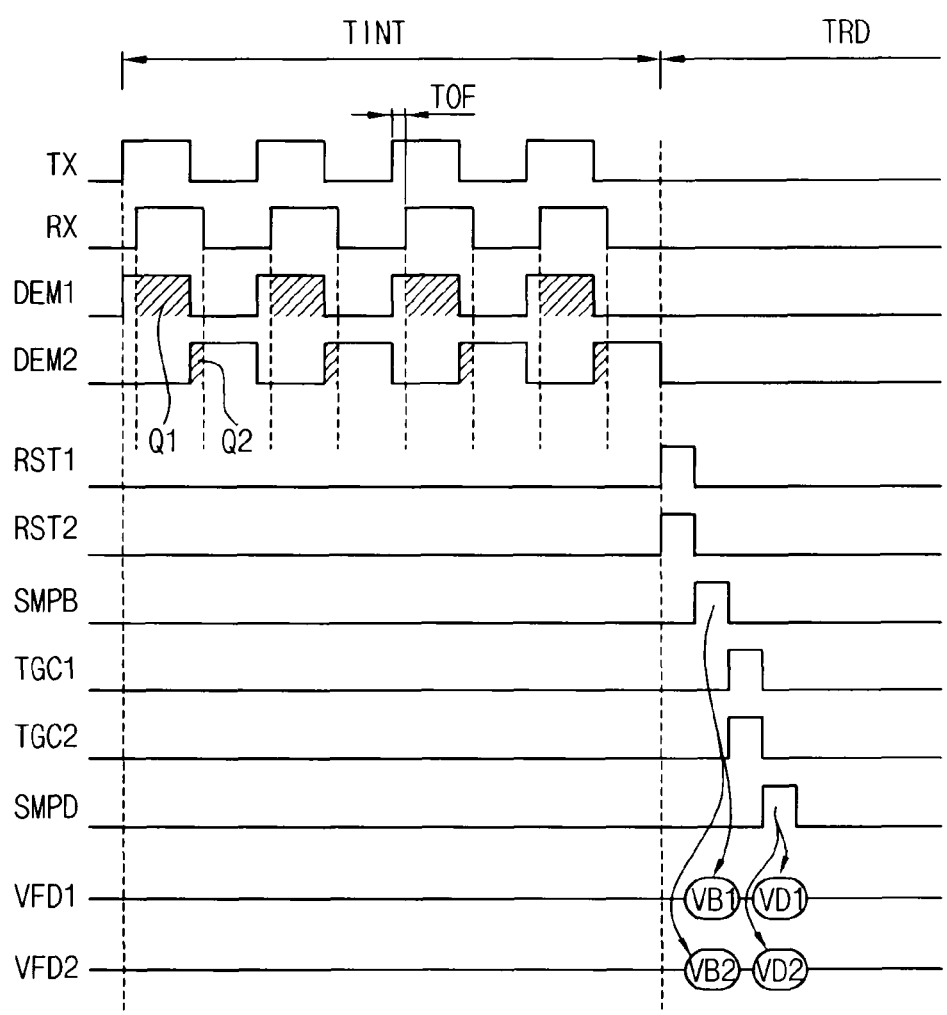
FIG. 12 is a timing diagram illustrating an example embodiment of a method of operating a photo-sensing device including the depth pixel of FIG. 11.

FIG. 12 is an example timing diagram illustrating a method of operating a photo-sensing device including the depth pixel of FIG. 11.

Referring to FIG. 12, the photo-sensing device 100 as illustrated in FIG. 7 illuminates the object 60 with the modulated transmission light TX, which is reflected by the object 60 and returns to the photo-sensing device 100 as the reception light RX. The reception light RX is delayed by the TOF with respect to the modulated transmission light TX. The photo-charge is generated in the photo-detection regions PD1 and PD2 of the depth pixel by the reception light RX.

The demodulation signals DEM1 and DEM2, which are activated to have periodically varying intensity during the integration time interval TINT, have respective phase differences with respect to the modulated transmission light TX. For example, the first demodulation signal DEM1 may have a phase equal or substantially equal to the phase of the modulated transmission light TX and the second demodulation signal DEM2 may have a phase opposite to the phase of the modulated transmission light TX as illustrated in FIG. 12. In response to the demodulations signals DEM1 and DEM2, a first charge Q1 corresponding to the phase of the first demodulation signal DEM1 is stored in the first bridge diffusion node BD1 and a second charge Q2 corresponding to the phase of the second demodulation signal DEM2 is stored in the second bridge diffusion node BD2. The TOF may be determined by measuring the charges Q1 and Q2 corresponding to the respective phases of the first and second demodulation signals DEM1 and DEM2.

FIG. 12 illustrates an example embodiment in which the bridge diffusion node and the floating diffusion region are electrically-connected after the noise voltage is sampled, and then the demodulation voltage is sampled.

During the readout time interval TRD, the reset signals RST1 and RST2 are activated to apply the reset voltage VRST to the floating diffusion regions FD1 and FD2. The first sampling control signal SMPB is activated after the reset voltage VRST is applied to the floating diffusion nodes FD1 and FD2, and then the reset floating diffusion region voltages VFD1 and VFD2 are sampled as the noise voltages VB1 and VB2, respectively. The bridge diffusion nodes BD1 and BD2 and the floating diffusion regions FD1 and FD2 are electrically connected to each other after the noise voltages VB1 and VB2 are sampled, and then the second sampling control signal SMPD is activated to sample the floating diffusion region voltages VFD1 and VFD2 as the demodulation voltages VD1 and VD2, respectively.

The valid voltages may be determined based on the noise voltages VB1 and VB2 and the demodulation voltages VD1 and VD2. For example, the difference between the first noise voltage VB1 and the first demodulation voltage VD1 may be determined as the first valid voltage V1 (=|VB1−VD1|) and the difference between the second noise voltage VB2 and the second demodulation voltage VD2 may be determined as the second valid voltage V2 (=|VB2−VD2|). If P1 is the phase difference between the first demodulation signal DEM1 and the modulated transmission light TX and the P2 is the phase difference between the second demodulation signal DEM2 and the modulated transmission light TX, then the phase of the reception light RX may be determined as (P1*V1+ P2*V2)/(V1+V2), and thus the TOF or the distance to the object may be determined.

As such, the generated photo-charges may be stored in the bridge diffusion nodes BD1 and BD2 corresponding to the temporary storage region TSR and the noise voltages VB1 and VB2 corresponding to the noises in the floating diffusion regions FD1 and FD2 may be sampled before the demodulation voltages VD1 and VD2 are sampled. Accordingly the SNR may be enhanced to obtain the more accurate valid voltages.

Figure 13:
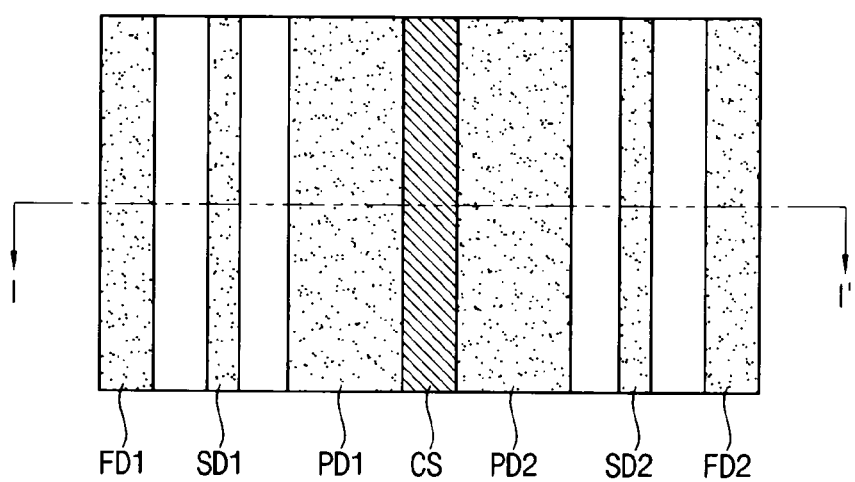
FIG. 13 is a diagram illustrating a layout of a depth pixel including a plurality of floating diffusion regions and a storage node according to an example embodiment.
Figure 14:
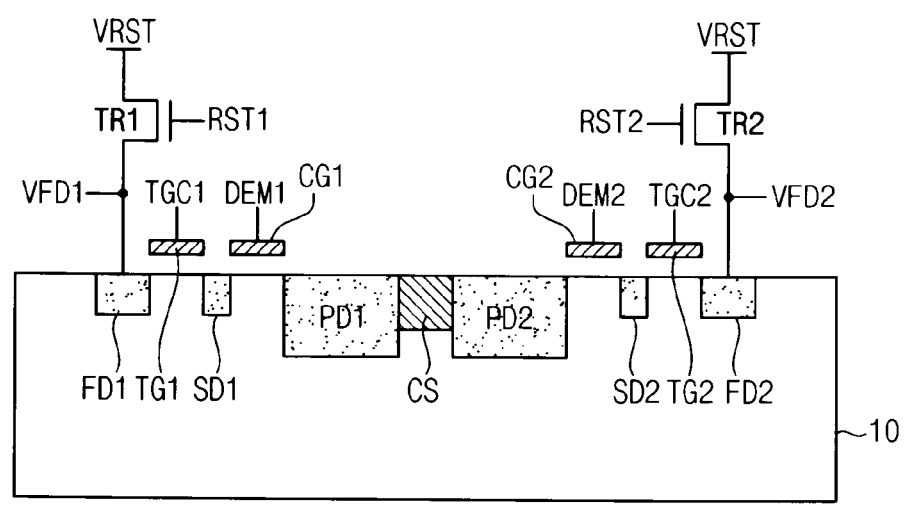
FIG. 14 is a cross-sectional diagram illustrating an example vertical structure of the depth pixel of FIG. 13.

FIG. 13 is a diagram illustrating a layout of a depth pixel including a plurality of floating diffusion regions and a storage node according to an example embodiment. FIG. 14 is a cross-sectional diagram illustrating an example vertical structure of the depth pixel taken along the line I-I' of FIG. 13.

Referring to FIGS. 13 and 14, the depth pixel Z2 may include a first photo-detection region PD1, a second photo-detection region PD2, a channel stop region CS, a first storage node SD1, a second storage node SD2, a first floating diffusion region FD1 and a second floating diffusion region FD2, which are formed in a semiconductor substrate 10. In addition, the depth pixel Z2 may include a first collection gate CG1, a second collection gate CG2, a first transfer gate TG1 and a second transfer gate TG2, which are formed over the semiconductor substrate 10. Hereinafter, the repeated description with FIGS. 10 and 11 will be omitted.

The depth pixel Z2 includes the plurality of floating diffusion regions FD1 and FD2 to sample a plurality of demodulation voltages VD1 and VD2 in response to a plurality of demodulation signals DEM1 and DEM2 having phases different from each other. For example, the depth pixel Z2 may include the two floating diffusion regions FD1 and FD2 as illustrated in FIGS. 13 and 14 to form two half pixels divided by the channel stop region CS.

The storage nodes SD1 and SD2 corresponding to the temporary storage region TSR are formed spaced apart from the photo-detection regions PD1 and PD2, respectively. The collection gates CG1 and CG2 are formed over the semiconductor substrate 10 between the photo-detection regions PD1 and PD2 and the storage nodes SD1 and SD2. The photo-charges generated in the photo-detection regions PD1 and PD2 are stored in the storage nodes SD1 and SD2 in response to the demodulation signals DEM1 and DEM2 applied to the collection gates CG1 and CG2. That is, for example, the photo-charges corresponding to the phases of the demodulation signals DEM1 and DEM2 are stored in the storage nodes SD1 and SD2, respectively. The channels are formed in the upper surface portions of the semiconductor substrate 10 in response to the transfer control signals TGC1 and TGC2, and the storage nodes SD1 and SD2 and the floating diffusion regions FD1 and FD2 may be electrically connected through the formed channels. The reset voltage VRST may be applied to the floating diffusion regions FD1 and FD2 in response to the reset signals RST1 and RST2. The floating diffusion region voltages VFD1 and VFD2 may be sampled as the noise voltage VB1 and VB2 and the demodulation voltage VD1 and VD2.

The method of measuring the distance using the depth pixel Z2 of FIG. 13 is similar to the method of FIG. 12 using the depth pixel Z1 of FIG. 10. In the depth pixel Z2 of FIG. 13, the demodulation signals DEM1 and DEM2 are applied to the collection gates CG1 and CG2 during the integration time interval TINT to store the photo-charges in the storage nodes SD1 and SD2 spaced apart from the photo-detection regions PD1 and PD2, whereas in the depth pixel Z1 of FIG. 10, the demodulation signals DEM1 and DEM2 are applied to the photo gates PG1 and PG2 during the integration time interval TINT to store the photo-charges in the bridge diffusion nodes BD1 and BD2 adjacent to the photo-detection regions PD1 and PD2.

As a result, in the depth pixel Z2 of FIG. 13, the storage nodes SD1 and SD2 are electrically connected to the floating diffusion regions FD1 and FD2 after the noise voltages VB1 and VB2 are sampled and then the demodulation voltages VD1 and VD2 are sampled, whereas in the depth pixel Z1 of FIG. 10, the bridge diffusion nodes BD1 and BD2 are electrically connected to the floating diffusion regions FD1 and FD2 after the noise voltages VB1 and VB2 are sampled and then the demodulation voltages VD1 and VD2 are sampled.

During the readout time interval TRD, the reset signals RST1 and RST2 are activated to apply the reset voltage VRST to the floating diffusion regions FD1 and FD2. The first sampling control signal SMPB is activated after the reset voltage VRST is applied to the floating diffusion nodes FD1 and FD2, and then the reset floating diffusion region voltages VFD1 and VFD2 are sampled as the noise voltages VB1 and VB2, respectively. The storage nodes SD1 and SD2 and the floating diffusion regions FD1 and FD2 are electrically connected to each other after the noise voltages VB1 and VB2 are sampled, and then the second sampling control signal SMPD is activated to sample the floating diffusion region voltages VFD1 and VFD2 as the demodulation voltages VD1 and VD2, respectively.

As such, the generated photo-charges may be stored in the storage nodes SD1 and SD2 corresponding to the temporary storage region TSR and the noise voltages VB1 and VB2 corresponding to the noises in the floating diffusion regions FD1 and FD2 may be sampled before the demodulation voltages VD1 and VD2 are sampled. Accordingly the SNR may be enhanced to obtain the more accurate valid voltages.

Figure 15:
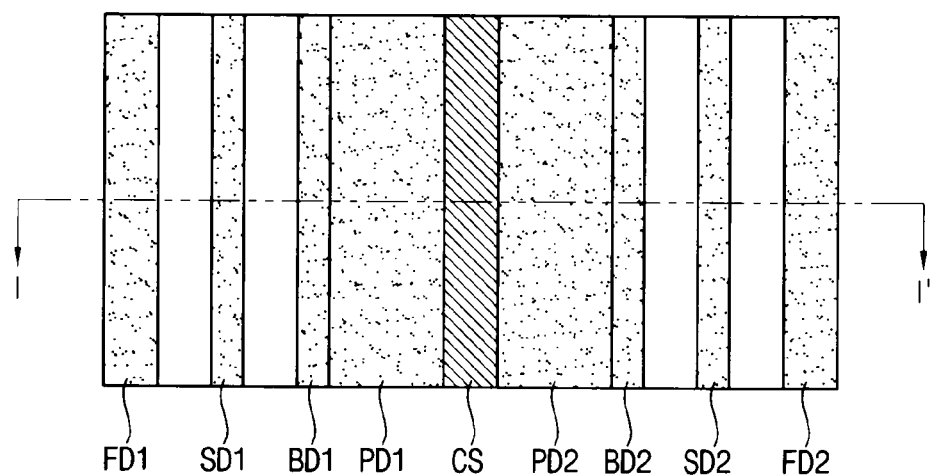
FIG. 15 is a diagram illustrating a layout of a depth pixel including a plurality of floating diffusion regions, a bridge diffusion node and a storage node according to an example embodiment.
Figure 16:
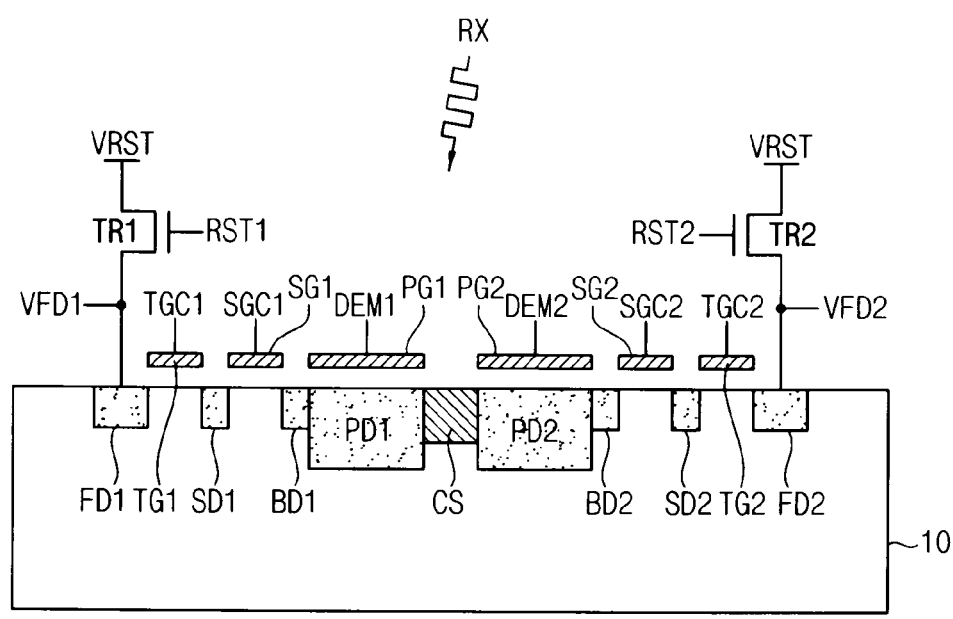
FIG. 16 is a cross-sectional diagram illustrating an example vertical structure of the depth pixel of FIG. 15.

FIG. 15 is a diagram illustrating a layout of a depth pixel including a plurality of floating diffusion regions, a bridge diffusion node and a storage node according to another example embodiment. FIG. 16 is a cross-sectional diagram illustrating an example vertical structure of the depth pixel taken along the line I-I' of FIG. 15.

Referring to FIGS. 15 and 16, the depth pixel Z3 may include a first photo-detection region PD1, a second photo-detection region PD2, a channel stop region CS, a first bridge diffusion node BD1, a second bridge diffusion node BD2, a first storage node SD1, a second storage node SD2, a first floating diffusion region FD1 and a second floating diffusion region FD2, which are formed in a semiconductor substrate 10. In addition, the depth pixel Z3 may include a first photo gate PG1, a second photo gate PG2, a first collection gate CG1, a second collection gate CG2, a first transfer gate TG1 and a second transfer gate TG2, which are formed over the semiconductor substrate 10. Hereinafter, the repeated description will be omitted.

The depth pixel Z3 includes the plurality of floating diffusion regions FD1 and FD2 to sample a plurality of demodulation voltages VD1 and VD2 in response to a plurality of demodulation signals DEM1 and DEM2 having phases different from each other. For example, the depth pixel Z3 may include the two floating diffusion regions FD1 and FD2 as illustrated in FIGS. 15 and 16 to form two half pixels divided by the channel stop region CS.

The bridge diffusion nodes BD1 and BD2 corresponding to a portion of the temporary storage region TSR are formed adjacent to the photo-detection regions PD1 and PD2 and the storage nodes SD1 and SD2 corresponding to another portion of the temporary storage region TSR are formed spaced apart from the bridge diffusion nodes BD1 and BD2, respectively. The photo gates PG1 and PG2 are formed over the photo-detection regions PD1 and PD2. The collection gates CG1 and CG2 are formed over the semiconductor substrate 10 between the bridge diffusion nodes BD1 and BD2 and the storage nodes SD1 and SD2. The photo-charges generated in the photo-detection regions PD1 and PD2 are stored in the bridge diffusion nodes BD1 and BD2 in response to the demodulation signals DEM1 and DEM2 applied to the photo gates PG1 and PG2. That is, for example, the photo-charges corresponding to the phases of the demodulation signals DEM1 and DEM2 are stored in the bridge diffusion nodes BD1 and BD2, respectively. The channels are formed in the upper surface portions of the semiconductor substrate 10 in response to storage control signals SGC1 and SGC2 applied to the storage gates SG1 and SG2, and thus, the bridge diffusion nodes BD1 and BD2 and the storage nodes SD1 and SD2 may be electrically connected through the formed channels. Also, the channels are formed in the upper surface portions of the semiconductor substrate 10 in response to the transfer control signals TGC1 and TGC2 applied to the transfer gates TG1 and TG2, and thus, the storage nodes SD1 and SD2 and the floating diffusion regions FD1 and FD2 may be electrically connected through the formed channels. The reset voltage VRST may be applied to the floating diffusion regions FD1 and FD2 in response to the reset signals RST1 and RST2. The floating diffusion region voltages VFD1 and VFD2 may be sampled as the noise voltage VB1 and VB2 and the demodulation voltage VD1 and VD2.

Figure 17:
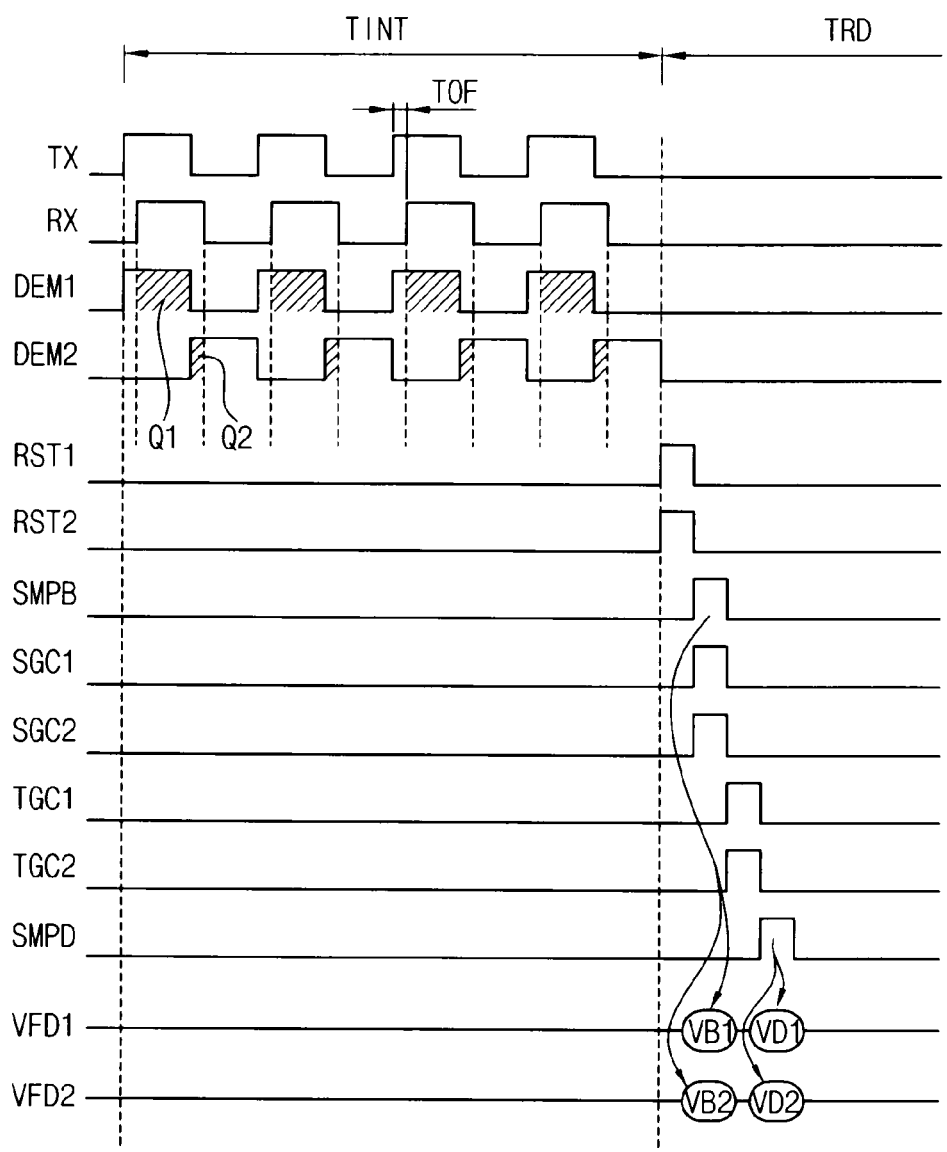
FIG. 17 is a timing diagram illustrating an example embodiment of a method of operating a photo-sensing device including the depth pixel of FIG. 16.

FIG. 17 is an example timing diagram illustrating a method of operating a photo-sensing device including the depth pixel of FIG. 16.

The method of FIG. 17 is similar to the method of FIG. 12 and the repeated description will be omitted. Compared with the method of FIG. 12, the method of FIG. 17 further includes electrically-connecting the bridge diffusion nodes BD1 and BD2 and the storage nodes SD1 and SD2 in response to the storage control signals SGC1 and SGC2 during the readout time interval TRD. Even though the storage control signals SGC1 and SGC2 are activated concurrently or simultaneously with the first sampling control signal SMPB in FIG. 17, it is sufficient that the storage control signals SGC1 and SGC2 are activated after the integration time interval TINT and before the transfer control signals TGC1 and TGC2 are activated.

As a result, in the depth pixel Z3 of FIG. 15, the storage nodes SD1 and SD2 are electrically connected to the floating diffusion regions FD1 and FD2 after the noise voltages VB1 and VB2 are sampled and then the demodulation voltages VD1 and VD2 are sampled, whereas, in the depth pixel Z2 of FIG. 13, the bridge diffusion nodes BD1 and BD2 are electrically connected to the floating diffusion regions FD1 and FD2 after the noise voltages VB1 and VB2 are sampled and then the demodulation voltages VD1 and VD2 are sampled.

As such, the generated photo-charges may be stored in the bridge diffusion nodes BD1 and BD2 and the storage nodes SD1 and SD2 corresponding to the temporary storage region TSR and the noise voltages VB1 and VB2 corresponding to the noises in the floating diffusion regions FD1 and FD2 may be sampled before the demodulation voltages VD1 and VD2 are sampled. Accordingly the SNR may be enhanced to obtain the more accurate valid voltages.

Figure 18:
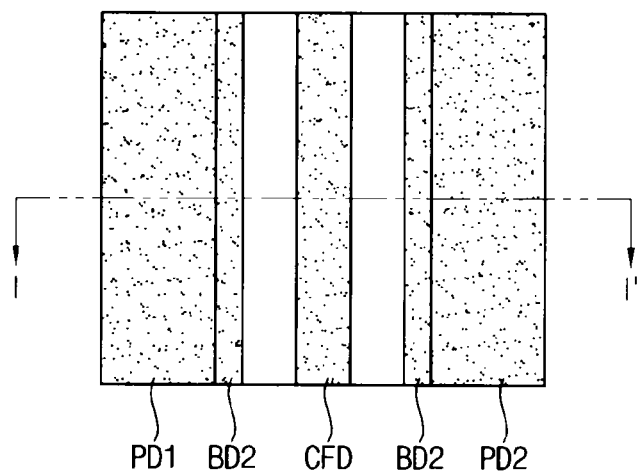
FIG. 18 is a diagram illustrating a layout of a depth pixel including a common floating diffusion region and a bridge diffusion node according to an example embodiment.
Figure 19:
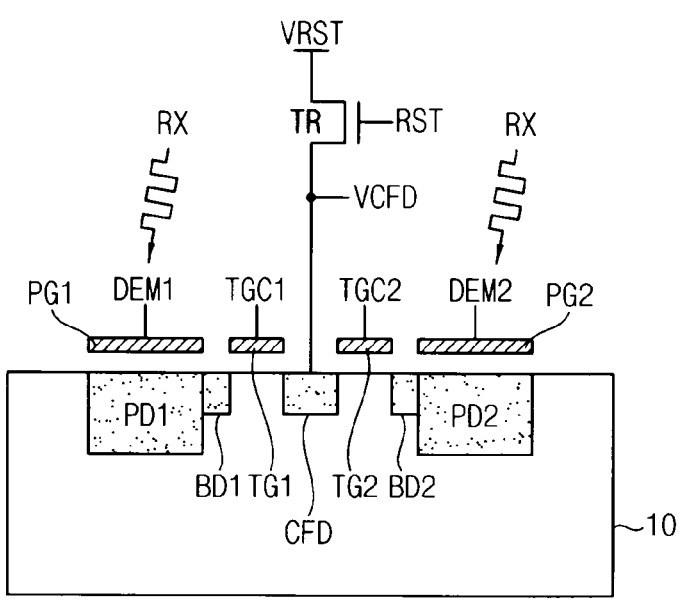
FIG. 19 is a cross-sectional diagram illustrating an example vertical structure of the depth pixel of FIG. 18.

FIG. 18 is a diagram illustrating a layout of a depth pixel including a common floating diffusion region and a bridge diffusion node according to another example embodiment. FIG. 19 is a cross-sectional diagram illustrating an example vertical structure of the depth pixel taken along the line I-I' of FIG. 18.

Referring to FIGS. 18 and 19, the depth pixel Z4 may include a first photo-detection region PD1, a second photo-detection region PD2, a first bridge diffusion node BD1, a second bridge diffusion node BD2, and a common floating diffusion region CFD, which are formed in a semiconductor substrate 10. In addition, the depth pixel Z4 may include a first photo gate PG1, a second photo gate PG2, a first transfer gate TG1 and a second transfer gate TG2, which are formed over the semiconductor substrate 10.

The depth pixel Z4 includes the one common floating diffusion region CFD to sequentially sample a plurality of demodulation voltages VD1 and VD2 in response to a plurality of demodulation signals DEM1 and DEM2 having phases different from each other. For example, the depth pixel Z4 may include two half pixels divided by the common floating diffusion region CFD as illustrated in FIGS. 18 and 19.

The bridge diffusion nodes BD1 and BD2 corresponding to the temporary storage region TSR are formed adjacent to the photo-detection regions PD1 and PD2, respectively. The photo gates PG1 and PG2 are formed over the photo-detection regions PD1 and PD2 and the photo-charges are stored in the bridge diffusion nodes BD1 and BD2 in response to the demodulation signals DEM1 and DEM2 applied to the photo gates PG1 and PG2. That is, for example, the photo-charges corresponding to the phases of the demodulation signals DEM1 and DEM2 are stored in the bridge diffusion nodes BD1 and BD2, respectively. The channels are formed in the upper surface portions of the semiconductor substrate 10 in response to the transfer control signals TGC1 and TGC2, and the bridge diffusion nodes BD1 and BD2 may be electrically connected to the common floating diffusion region CFD through the formed channels, respectively. The transfer control signals TGC1 and TGC2 have different activation timings since the depth pixel Z4 includes the one common floating diffusion region CFD. The reset voltage VRST may be applied to the common floating diffusion region CFD in response to the reset signal RST. The common floating diffusion region voltage VCFD may be sequentially sampled as the noise voltage VB1 and VB2 and the demodulation voltage VD1 and VD2.

Figure 20:
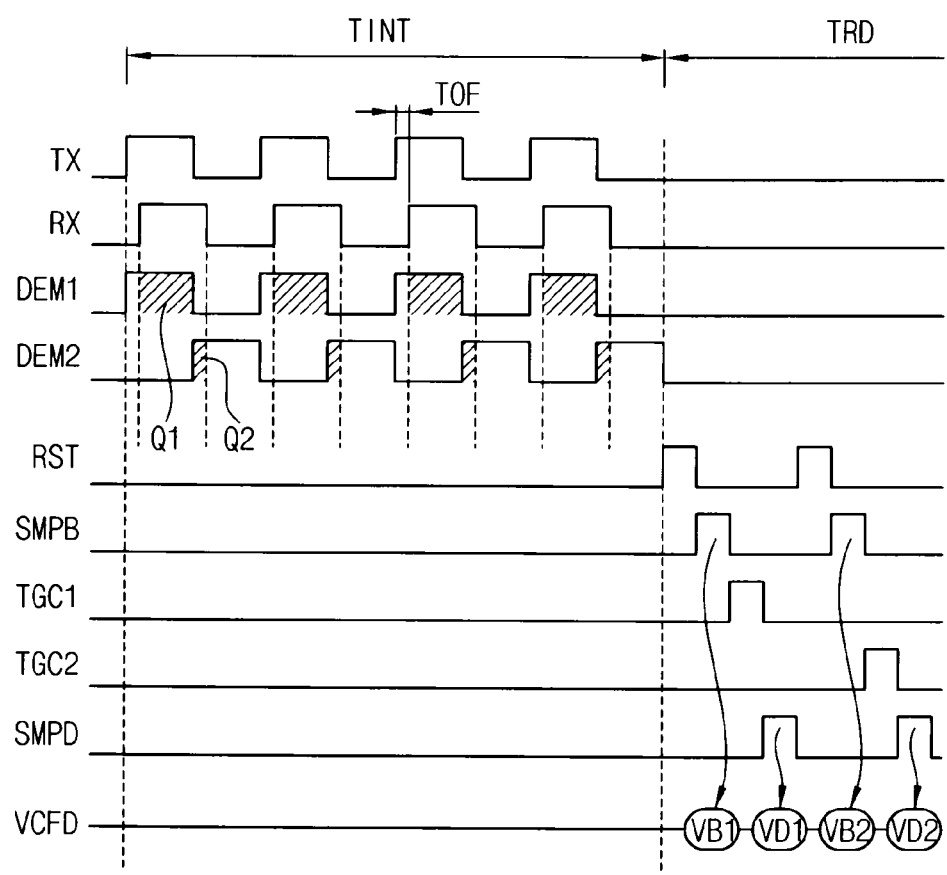
FIG. 20 is a timing diagram illustrating a method of operating a photo-sensing device including the depth pixel of FIG. 19.

FIG. 20 is an example timing diagram illustrating a method of operating a photo-sensing device including the depth pixel of FIG. 19.

Referring to FIG. 20, the photo-sensing device 100 as illustrated in FIG. 7 illuminates the object 60 with the modulated transmission light TX, which is reflected by the object 60 and returns to the photo-sensing device 100 as the reception light RX. The reception light RX is delayed by the TOF with respect to the modulated transmission light TX. The photo-charge is generated in the photo-detection regions PD1 and PD2 of the depth pixel by the reception light RX.

The demodulation signals DEM1 and DEM2, which are activated to have periodically varying intensity during the integration time interval TINT, have respective phase differences with respect to the modulated transmission light TX. For example, the first demodulation signal DEM1 may have a phase equal or substantially equal to the phase of the modulated transmission light TX and the second demodulation signal DEM2 may have a phase opposite to the phase of the modulated transmission light TX as illustrated in FIG. 20. In response to the demodulations signals DEM1 and DEM2, a first charge Q1 corresponding to the phase of the first demodulation signal DEM1 is stored in the first bridge diffusion node BD1 and a second charge Q2 corresponding to the phase of the second demodulation signal DEM2 is stored in the second bridge diffusion node BD2. The TOF may be determined by measuring the charges Q1 and Q2 corresponding to the respective phases of the first and second demodulation signals DEM1 and DEM2.

FIG. 20 illustrates an example embodiment in which the bridge diffusion node and the floating diffusion region are electrically-connected after the noise voltage is sampled, and then the demodulation voltage is sampled.

During the readout time interval TRD, the reset signal RST is activated to apply the reset voltage VRST to the common floating diffusion region CFD. The first sampling control signal SMPB is activated after the reset voltage VRST is applied to the common floating diffusion node CFD, and then the reset floating diffusion region voltage VCFD is sampled as the first noise voltage VB1. The first bridge diffusion node BD1 is electrically connected to the common floating diffusion region CFD in response to the first transfer control signal TGC1 after the first noise voltage VB1 is sampled, and then the second sampling control signal SMPD is activated to sample the common floating diffusion region voltage VCFD as the first demodulation voltage VD1.

The reset signal RST is activated again to apply the reset voltage VRST to the common floating diffusion region CFD after the first demodulation voltage VD1 is sampled. The first sampling control signal SMPB is activated after the reset voltage VRST is applied to the common floating diffusion node CFD, and then the reset floating diffusion region voltages VCFD is sampled as the second noise voltage VB2. The second bridge diffusion node BD2 is electrically connected to the common floating diffusion region CFD in response to the second transfer control signal TGC2 after the second noise voltage VB2 is sampled, and then the second sampling control signal SMPD is activated to sample the common floating diffusion region voltage VCFD as the second demodulation voltage VD2.

As such, the noise voltages VB1 and VB2 and the demodulation voltages VD1 and VD2 may be sampled sequentially using the common floating diffusion region CFD. The generated photo-charges may be stored in the bridge diffusion nodes BD1 and BD2 corresponding to the temporary storage region TSR and each of the noise voltages VB1 and VB2 corresponding to the noises in the floating diffusion regions FD1 and FD2 may be sampled before each of the demodulation voltages VD1 and VD2 is sampled. Accordingly the SNR may be enhanced to obtain the more accurate valid voltages.

Figure 21:
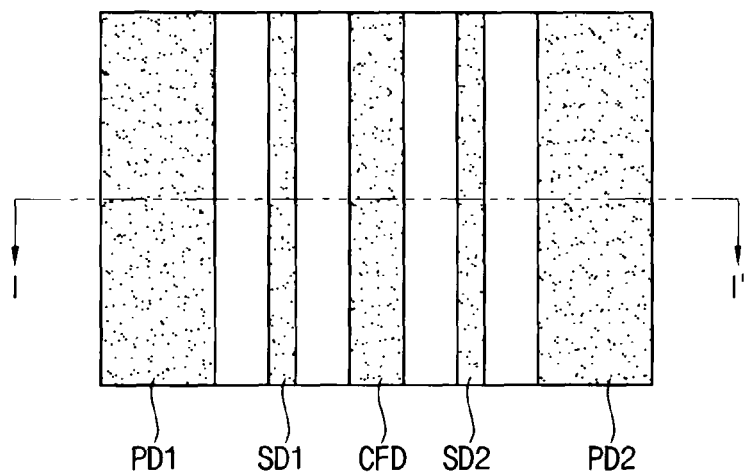
FIG. 21 is a diagram illustrating a layout of a depth pixel including a common floating diffusion region and a storage node according to an example embodiment.
Figure 22:
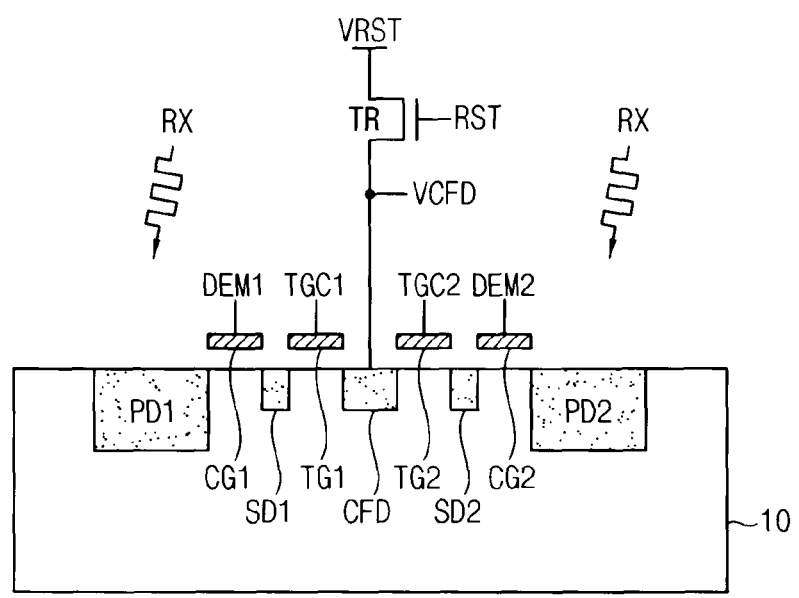
FIG. 22 is a cross-sectional diagram illustrating an example vertical structure of the depth pixel of FIG. 21.

FIG. 21 is a diagram illustrating a layout of a depth pixel including a common floating diffusion region and a storage node according to another example embodiment. FIG. 22 is a cross-sectional diagram illustrating an example vertical structure of the depth pixel taken along the line I-I' of FIG. 21.

Referring to FIGS. 21 and 22, the depth pixel Z5 may include a first photo-detection region PD1, a second photo-detection region PD2, a first storage node SD1, a second storage node SD2, and a common floating diffusion region CFD, which are formed in a semiconductor substrate 10. In addition, the depth pixel Z5 may include a first collection gate CG1, a second collection gate CG2, a first transfer gate TG1 and a second transfer gate TG2, which are formed over the semiconductor substrate 10.

The depth pixel Z5 includes the common floating diffusion region CFD to sequentially sample a plurality of demodulation voltages VD1 and VD2 in response to a plurality of demodulation signals DEM1 and DEM2 having phases different from each other. For example, the depth pixel Z5 may include two half pixels divided by the common floating diffusion region CFD as illustrated in FIGS. 21 and 22.

The storage nodes SD1 and SD2 corresponding to the temporary storage region TSR are formed spaced apart from the photo-detection regions PD1 and PD2, respectively. The collection gates CG1 and CG2 are formed over the semiconductor substrate 10 between the photo-detection regions PD1 and PD2 and the storage nodes SD1 and SD2. The photo-charges generated in the photo-detection regions PD1 and PD2 are stored in the storage nodes SD1 and SD2 in response to the demodulation signals DEM1 and DEM2 applied to the collection gates CG1 and CG2. That is, for example, the photo-charges corresponding to the phases of the demodulation signals DEM1 and DEM2 are stored in the storage nodes SD1 and SD2, respectively. The channels are formed in the upper surface portions of the semiconductor substrate 10 in response to the transfer control signals TGC1 and TGC2, and the storage nodes SD1 and SD2 may be electrically connected to the common floating diffusion region CFD through the formed channels, respectively. The transfer control signals TGC1 and TGC2 have different activation timings since the depth pixel Z5 includes the one common floating diffusion region CFD. The reset voltage VRST may be applied to the common floating diffusion region CFD in response to the reset signal RST. The common floating diffusion region voltage VCFD may be sequentially sampled as the noise voltage VB1 and VB2 and the demodulation voltage VD1 and VD2.

The method of measuring the distance using the depth pixel Z5 of FIG. 21 is similar to the method of FIG. 12 using the depth pixel Z4 of FIG. 18. In the depth pixel Z5 of FIG. 21, the demodulation signals DEM1 and DEM2 are applied to the collection gates CG1 and CG2 during the integration time interval TINT to store the photo-charges in the storage nodes SD1 and SD2 spaced apart from the photo-detection regions PD1 and PD2, whereas in the depth pixel Z4 of FIG. 18, the demodulation signals DEM1 and DEM2 are applied to the photo gates PG1 and PG2 during the integration time interval TINT to store the photo-charges in the bridge diffusion nodes BD1 and BD2 adjacent to the photo-detection regions PD1 and PD2.

As a result, in the depth pixel Z5 of FIG. 21, each of the storage nodes SD1 and SD2 is electrically connected to the common floating diffusion regions CFD after each of the noise voltages VB1 and VB2 is sampled and then each of the demodulation voltages VD1 and VD2 is sampled, whereas in the depth pixel Z4 of FIG. 18, each of the bridge diffusion nodes BD1 and BD2 is electrically connected to the common floating diffusion region CFD after each of the noise voltages VB1 and VB2 is sampled and then each of the demodulation voltages VD1 and VD2 is sampled.

During the readout time interval TRD, the reset signal RST is activated to apply the reset voltage VRST to the common floating diffusion region CFD. The first sampling control signal SMPB is activated after the reset voltage VRST is applied to the common floating diffusion node CFD, and then the reset floating diffusion region voltages VCFD is sampled as the first noise voltage VB1. The first storage node SD1 is electrically connected to the common floating diffusion region CFD in response to the first transfer control signal TGC1 after the first noise voltage VB1 is sampled, and then the second sampling control signal SMPD is activated to sample the common floating diffusion region voltage VCFD as the first demodulation voltage VD1.

The reset signal RST is activated again to apply the reset voltage VRST to the common floating diffusion region CFD after the first demodulation voltage VD1 is sampled. The first sampling control signal SMPB is activated after the reset voltage VRST is applied to the common floating diffusion node CFD, and then the reset floating diffusion region voltages VCFD is sampled as the second noise voltage VB2. The second storage node SD1 is electrically connected to the common floating diffusion region CFD in response to the second transfer control signal TGC2 after the second noise voltage VB2 is sampled, and then the second sampling control signal SMPD is activated to sample the common floating diffusion region voltage VCFD as the second demodulation voltage VD2.

As such, the noise voltages VB1 and VB2 and the demodulation voltages VD1 and VD2 may be sampled sequentially using the common floating diffusion region CFD. The generated photo-charges may be stored in the storage nodes BD1 and BD2 corresponding to the temporary storage region TSR and each of the noise voltages VB1 and VB2 corresponding to the noises in the floating diffusion regions FD1 and FD2 may be sampled before each of the demodulation voltages VD1 and VD2 is sampled. Accordingly the SNR may be enhanced to obtain the more accurate valid voltages.

Figure 23:
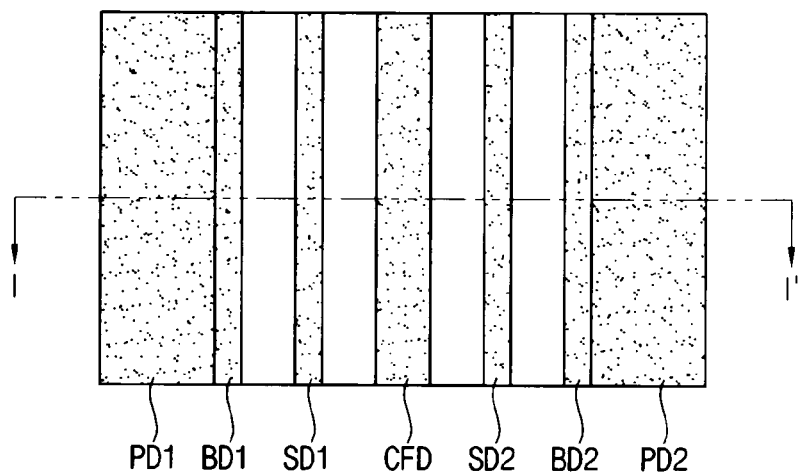
FIG. 23 is a diagram illustrating a layout of a depth pixel including a common floating diffusion region, a bridge diffusion node and a storage node according to an example embodiment.
Figure 24:
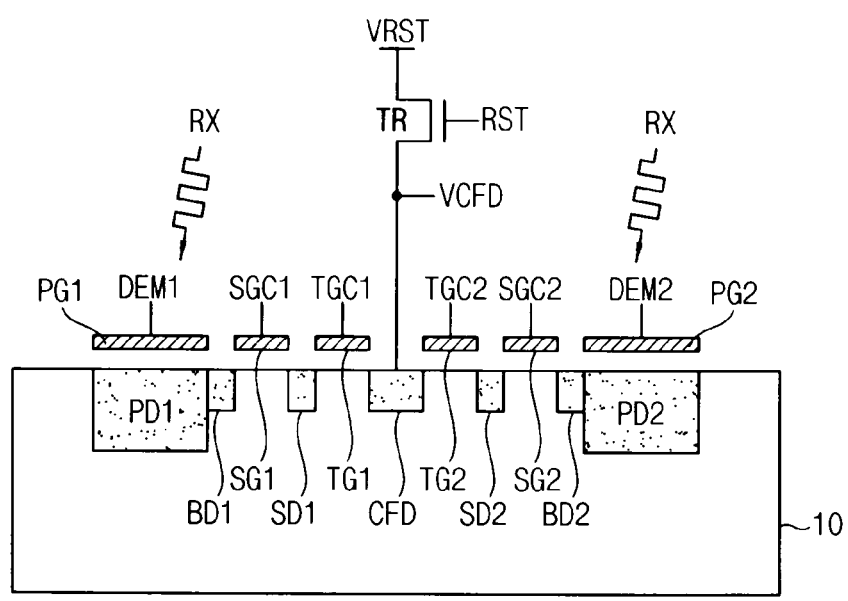
FIG. 24 is a cross-sectional diagram illustrating an example vertical structure of the depth pixel of FIG. 23.

FIG. 23 is a diagram illustrating a layout of a depth pixel including a common floating diffusion region, a bridge diffusion node and a storage node according to another example embodiment. FIG. 24 is a cross-sectional diagram illustrating an example vertical structure of the depth pixel taken along the line I-I' of FIG. 23.

Referring to FIGS. 23 and 24, the depth pixel Z6 may include a first photo-detection region PD1, a second photo-detection region PD2, a first bridge diffusion node BD1, a second bridge diffusion node BD2, a first storage node SD1, a second storage node SD2, and a common floating diffusion region CFD, which are formed in a semiconductor substrate 10. In addition, the depth pixel Z6 may include a first photo gate PG1, a second photo gate PG2, a first storage gate SG1, a second storage gate SG2, a first transfer gate TG1 and a second transfer gate TG2, which are formed over the semiconductor substrate 10.

The depth pixel Z6 includes the common floating diffusion region CFD to sequentially sample a plurality of demodulation voltages VD1 and VD2 in response to a plurality of demodulation signals DEM1 and DEM2 having phases different from each other. For example, the depth pixel Z6 may include two half pixels divided by the common floating diffusion region CFD as illustrated in FIGS. 23 and 24.

The bridge diffusion nodes BD1 and BD2 corresponding to a portion of the temporary storage region TSR are formed adjacent to the photo-detection regions PD1 and PD2, respectively. The storage nodes SD1 and SD2 corresponding to another portion of the temporary storage region TSR are formed spaced apart from the bridge diffusion nodes BD1 and BD2, respectively. The photo gates PG1 and PG2 are formed over the photo-detection regions PD1 and PD2 and the photo-charges are stored in the bridge diffusion nodes BD1 and BD2 in response to the demodulation signals DEM1 and DEM2 applied to the photo gates PG1 and PG2. That is, for example, the photo-charges corresponding to the phases of the demodulation signals DEM1 and DEM2 are stored in the bridge diffusion nodes BD1 and BD2, respectively. The storage gates SG1 and SG2 are formed over the semiconductor substrate 10 between the bridge diffusion nodes BD1 and BD2 and the storage nodes SD1 and SD2, respectively. The transfer gates TG1 and TG2 are formed over the semiconductor substrate 10 between the common floating diffusion node CFD and the storage nodes SD1 and SD2, respectively. The channels are formed in the upper surface portions of the semiconductor substrate 10 in response to storage control signals SGC1 and SGC2 applied to the storage gates SG1 and SG2, and thus, the bridge diffusion nodes BD1 and BD2 and the storage nodes SD1 and SD2 may be electrically connected through the formed channels. Also the channels are formed in the upper surface portions of the semiconductor substrate 10 in response to the transfer control signals TGC1 and TGC2 applied to the transfer gates TG1 and TG2, and thus, the storage nodes SD1 and SD2 and the floating diffusion regions FD1 and FD2 may be electrically connected through the formed channels. The transfer control signals TGC1 and TGC2 have different activation timings since the depth pixel Z6 includes the one common floating diffusion region CFD. The reset voltage VRST may be applied to the common floating diffusion region CFD in response to the reset signal RST. The common floating diffusion region voltage VCFD may be sequentially sampled as the noise voltage VB1 and VB2 and the demodulation voltage VD1 and VD2.

Figure 25:
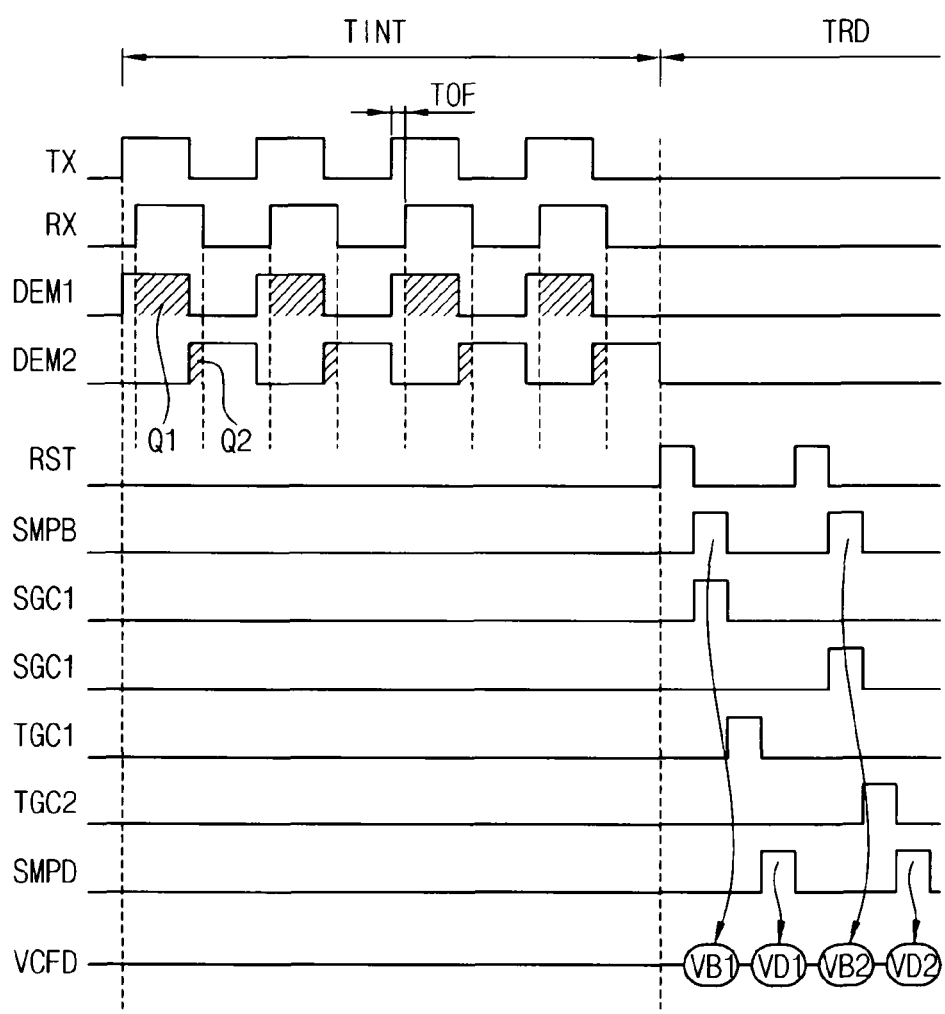
FIG. 25 is a timing diagram illustrating a method of operating a photo-sensing device including the depth pixel of FIG. 24.

FIG. 25 is an example timing diagram illustrating a method of operating a photo-sensing device including the depth pixel of FIG. 24.

The method of FIG. 25 is similar to the method of FIG. 20 and the repeated description will be omitted. Compared with the method of FIG. 20, the method of FIG. 25 further includes electrically-connecting the bridge diffusion nodes BD1 and BD2 and the storage nodes SD1 and SD2 in response to the storage control signals SGC1 and SGC2 during the readout time interval TRD. Even though the storage control signals SGC1 and SGC2 are activated concurrently or simultaneously with the first sampling control signal SMPB in FIG. 25, it is sufficient that the storage control signals SGC1 and SGC2 are activated after the integration time interval TINT and before the transfer control signals TGC1 and TGC2 are activated.

As a result, in the depth pixel Z6 of FIG. 25, each of the storage nodes SD1 and SD2 is electrically connected to each of the floating diffusion regions FD1 and FD2 after each of the noise voltages VB1 and VB2 is sampled and then each of the demodulation voltages VD1 and VD2 is sampled, whereas in the depth pixel Z4 of FIG. 18, each of the bridge diffusion nodes BD1 and BD2 is electrically connected to the floating diffusion regions FD1 and FD2 after each of the noise voltages VB1 and VB2 is sampled and then each of the demodulation voltages VD1 and VD2 is sampled.

As such, the noise voltages VB1 and VB2 and the demodulation voltages VD1 and VD2 may be sampled sequentially using the common floating diffusion region CFD. The generated photo-charges may be stored in the bridge diffusion nodes BD1 and BD2 and the storage nodes SD1 and SD2 corresponding to the temporary storage region TSR and each of the noise voltages VB1 and VB2 corresponding to the noise in the floating diffusion regions FD1 and FD2 may be sampled before each of the demodulation voltages VD1 and VD2 is sampled. Accordingly the SNR may be enhanced to obtain the more accurate valid voltages.

Figure 26:
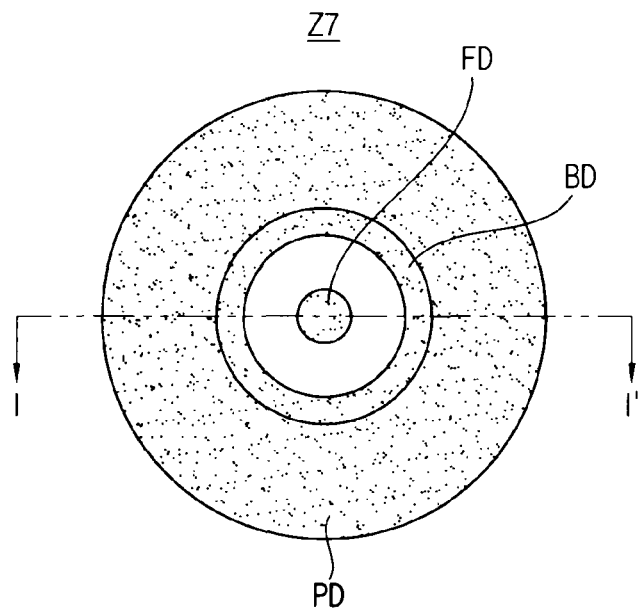
FIG. 26 is a diagram illustrating a layout of a ring-shaped depth pixel including a common floating diffusion region and a bridge diffusion node according to an example embodiment.
Figure 27:
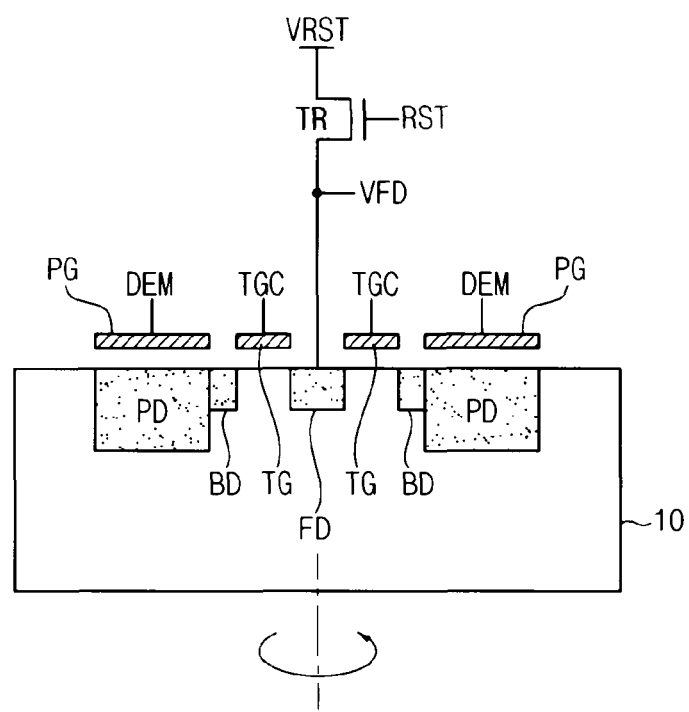
FIG. 27 is a cross-sectional diagram illustrating an example vertical structure of the depth pixel of FIG. 26.

FIG. 26 is a diagram illustrating a layout of a ring-shaped depth pixel including a common floating diffusion region and a bridge diffusion node according to an example embodiment. FIG. 27 is a cross-sectional diagram illustrating an example vertical structure of the depth pixel taken along the line I-I' of FIG. 26.

Referring to FIGS. 26 and 27, the depth pixel Z7 may include a floating diffusion region FD, a ring-shaped bridge diffusion node BD and a ring shaped photo-detection region PD, which are formed in a semiconductor substrate 10. In addition, the depth pixel Z7 may include a ring-shaped photo gate PG, and a ring-shaped transfer gate TG, which are formed over the semiconductor substrate 10. As illustrated in FIG. 26, the floating diffusion region FD is disposed at a center or central portion of the depth pixel Z7, the ring-shaped bridge diffusion node BD corresponding to the temporary storage region TSR surrounds the floating diffusion region FD and the ring-shaped photo-detection region PD surrounds the bridge diffusion node BD. As such, the depth pixel Z7 may have an overall ring shape. Even though FIG. 26 illustrates the depth pixel Z7 of a circular ring shape, the ring shape may have other ring shapes such as an elliptic shape, a rectangular shape, a pentagonal shape, etc.

The depth pixel Z7 includes the one floating diffusion region FD to sequentially sample a plurality of demodulation voltages VD1 and VD2 in response to a plurality of demodulation signals DEM1 and DEM2 having phases different from each other. For example, the first demodulation signal DEM1 may be applied firstly to the ring-shaped photo gate PG to sample the first demodulation voltage VD1 and then the second demodulation signal DEM2 may be applied secondly to the ring-shaped photo gate PG to sample the second demodulation voltage VD2. As such, two or more demodulation voltages may be sampled sequentially using two or more demodulation signals having different phases.

The ring-shaped bridge diffusion node BD corresponding to the temporary storage region TSR is formed adjacent to an inner surface of the ring-shaped photo-detection region PD. The ring-shaped photo gate PG is formed over the ring-shaped photo-detection region PD and the photo-charges are stored in the ring-shaped bridge diffusion node BD in response to each of the demodulation signals DEM1 and DEM2 applied to the ring-shaped photo gate PG. That is, for example, the photo-charges corresponding to the phases of the demodulation signals DEM1 and DEM2 are stored sequentially in the ring-shaped bridge diffusion node BD. The ring-shaped channel is formed in the upper surface portion of the semiconductor substrate 10 in response to the transfer control signal TGC, and the ring-shaped bridge diffusion node BD may be electrically connected to the floating diffusion region FD through the formed channel. The reset voltage VRST may be applied to the floating diffusion region FD in response to the reset signal RST. The floating diffusion region voltage VFD may be sequentially sampled as the noise voltage VB1 and VB2 and the demodulation voltage VD1 and VD2.

Figure 28:
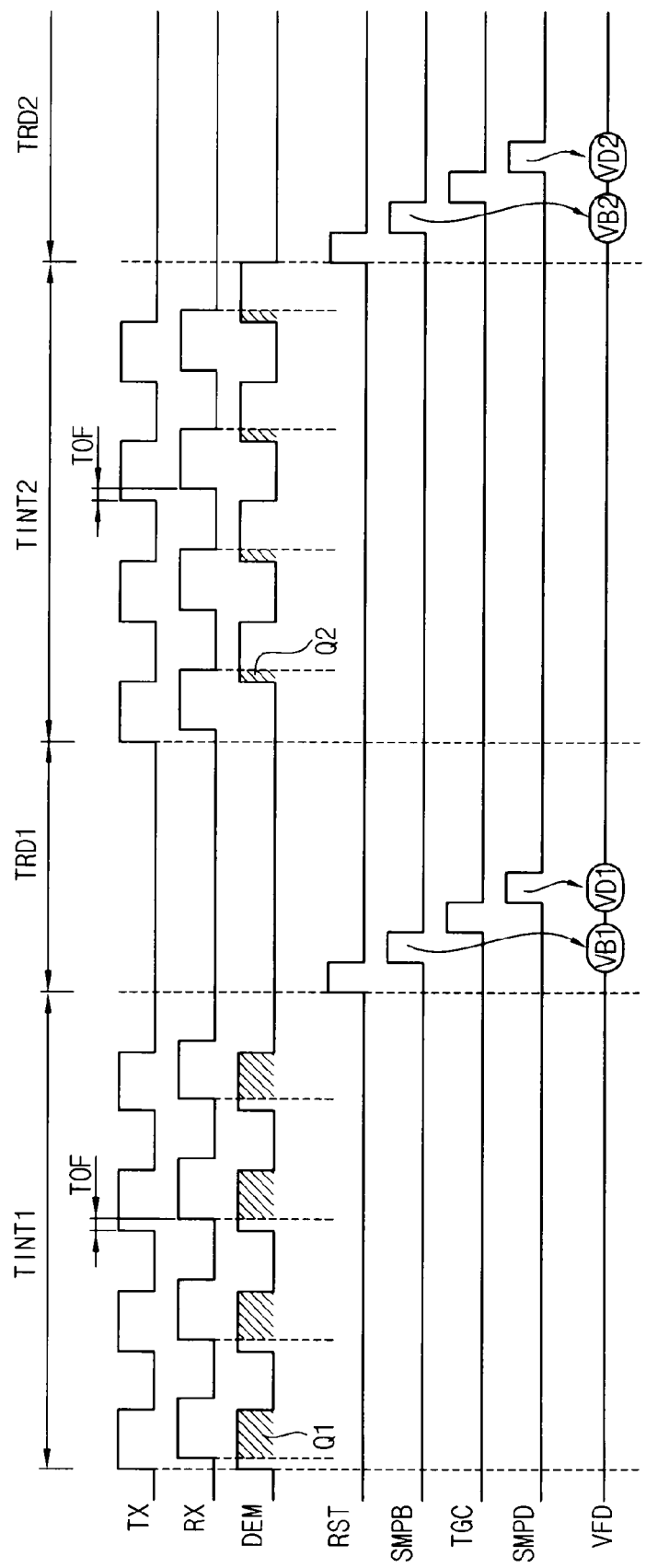
FIG. 28 is a timing diagram illustrating a method of operating a photo-sensing device including the depth pixel of FIG. 27.

FIG. 28 is an example timing diagram illustrating a method of operating a photo-sensing device including the depth pixel of FIG. 27.

Referring to FIG. 28, the photo-sensing device 100 as illustrated in FIG. 7 illuminates the object 60 with the modulated transmission light TX, which is reflected by the object 60 and returns to the photo-sensing device 100 as the reception light RX, The reception light RX is delayed by the TOF with respect to the modulated transmission light TX. The photo-charge is generated in the ring-shaped photo-detection region PD of the depth pixel by the reception light RX.

The demodulation signals DEM1 and DEM2, which are activated to have periodically varying intensity during the first and second integration time intervals TINT1 and TINT2, have respective phases that differ with respect to the modulated transmission light TX. For example, the first demodulation signal DEM1 during the first integration time interval TINT1 may have a phase equal or substantially equal to the phase of the modulated transmission light TX and the second demodulation signal DEM2 during the second integration time interval TINT2 may have a phase opposite to the phase of the modulated transmission light TX as illustrated in FIG. 28. In response to the first demodulation signal DEM1, a first charge Q1 corresponding to the phase of the first demodulation signal DEM1 is stored in the ring shaped bridge diffusion node BD during the first integration time interval TINT1. In response to the second demodulations signal DEM2, a second charge Q2 corresponding to the phase of the second demodulation signal DEM2 is stored in the ring-shaped bridge diffusion node BD during the second integration time interval TINT2. The TOF may be determined by measuring the charges Q1 and Q2 corresponding to the respective phases of the first and second demodulation signals DEM1 and DEM2.

FIG. 28 illustrates an example embodiment in which the ring-shaped bridge diffusion node and the floating diffusion region are electrically-connected after each of the noise voltages VB1 and VB2 is sampled, and then each of the demodulation voltages VD1 and VD2 is sampled.

During the first readout time interval TRD1 after the first integration time interval TINT1, the reset signal RST is activated to apply the reset voltage VRST to the floating diffusion region FD. The first sampling control signal SMPB is activated after the reset voltage VRST is applied to the floating diffusion node FD, and then the reset floating diffusion region voltage VFD is sampled as the first noise voltage VB1. The ring-shaped bridge diffusion node BD is electrically connected to the floating diffusion region FD in response to the transfer control signal TGC after the first noise voltage VB1 is sampled, and then the second sampling control signal SMPD is activated to sample the floating diffusion region voltage VCFD as the first demodulation voltage VD1. Although not illustrated in FIG. 28, the ring-shaped photo-detection region PD, the ring-shaped bridge diffusion node BD and the floating diffusion region FD may be initialized by activating the reset signal RST and the transfer control signal TGC after the first readout time interval TRD1 and before the second integration time interval TINT2.

In the same or a similar way, during the second readout time interval TRD2 after the second integration time interval TINT2, the reset signal RST is activated to apply the reset voltage VRST to the floating diffusion region FD. The first sampling control signal SMPB is activated after the reset voltage VRST is applied to the floating diffusion node FD, and then the reset floating diffusion region voltage VFD is sampled as the second noise voltage VB2. The ring-shaped bridge diffusion node BD is electrically connected to the floating diffusion region FD in response to the transfer control signal TGC after the second noise voltage VB2 is sampled, and then the second sampling control signal SMPD is activated to sample the floating diffusion region voltage VCFD as the second demodulation voltage VD2.

As such, the noise voltages VB1 and VB2 and the demodulation voltages VD1 and VD2 may be sampled sequentially using the floating diffusion region FD disposed in the center or central portion of the ring-shaped depth pixel Z7. The generated photo-charges may be stored in the ring-shaped bridge diffusion node BD corresponding to the temporary storage region TSR and each of the noise voltages VB1 and VB2 corresponding to the noises in the floating diffusion region FD may be sampled before each of the demodulation voltages VD1 and VD2 is sampled. Accordingly the SNR may be enhanced to obtain the more accurate valid voltages.

Figure 29:
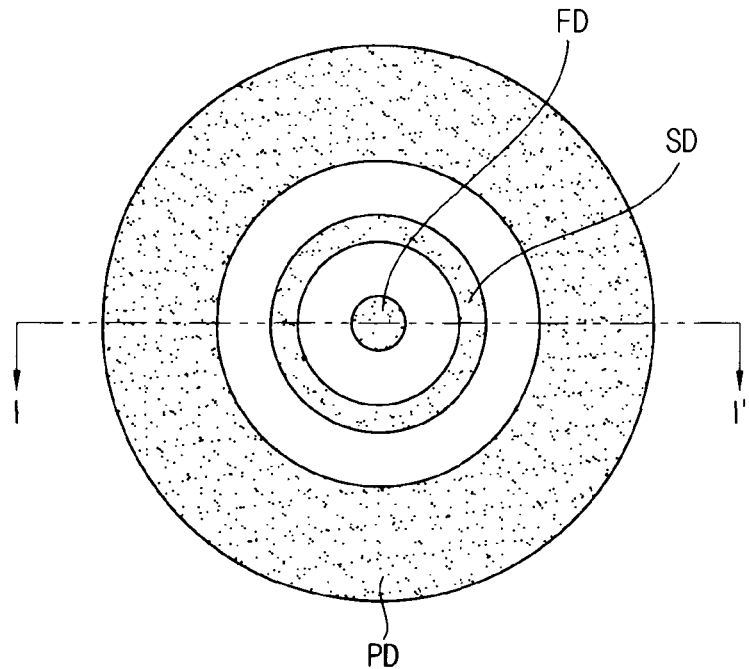
FIG. 29 is a diagram illustrating a layout of a ring-shaped depth pixel including a common floating diffusion region and a storage node according to an example embodiment.

FIG. 29 is a diagram illustrating a layout of a ring-shaped depth pixel including a common floating diffusion region and a storage node according to another example embodiment.

FIG. 30 is a cross-sectional diagram illustrating an example vertical structure of the depth pixel taken along the line I-I' of FIG. 29.

Referring to FIGS. 29 and 30, the depth pixel Z8 may include a floating diffusion region FD, a ring-shaped storage node SD and a ring shaped photo-detection region PD, which are formed in a semiconductor substrate 10. In addition, the depth pixel Z8 may include a ring-shaped collection gate CG and a ring-shaped transfer gate TG, which are formed over the semiconductor substrate 10. As illustrated in FIG. 29, the floating diffusion region FD is disposed at a center or central portion of the depth pixel Z8, the ring-shaped storage node SD corresponding to the temporary storage region TSR surrounds the floating diffusion region FD and the ring-shaped photo-detection region PD surrounds the storage node SD. As such, the depth pixel Z8 may have an overall ring shape.

The depth pixel Z8 includes the one floating diffusion region FD to sequentially sample a plurality of demodulation voltages VD1 and VD2 in response to a plurality of demodulation signals DEM1 and DEM2 having phases different from each other. For example, the first demodulation signal DEM1 may be applied firstly to the ring-shaped photo gate PG to sample the first demodulation voltage VD1 and then the second demodulation signal DEM2 may be applied secondly to the ring-shaped photo gate PG to sample the second demodulation voltage VD2. As such, two or more demodulation voltages may be sampled sequentially using two or more demodulation signals having different phases.

The ring-shaped storage node SD corresponding to the temporary storage region TSR is formed spaced apart from an inner surface of the ring-shaped photo-detection region PD. The ring-shaped collection gate CG is formed over the semiconductor substrate 10 between the ring-shaped photo-detection region PD and the ring-shaped storage node SD. The photo-charges generated in the ring-shaped photo-detection region PD are stored in the ring-shaped storage node SD in response to each of the demodulation signals DEM1 and DEM2 applied to the ring-shaped collection gate CG. That is, for example, the photo-charges corresponding to the phases of the demodulation signals DEM1 and DEM2 are stored sequentially in the ring-shaped storage node SD. The ring-shaped channel is formed in the upper surface portion of the semiconductor substrate 10 in response to the transfer control signal TGC, and the ring-shaped storage node SD may be electrically connected to the floating diffusion region FD through the formed channel. The reset voltage VRST may be applied to the floating diffusion region FD in response to the reset signal RST. The floating diffusion region voltage VFD may be sequentially sampled as the noise voltage VB1 and VB2 and the demodulation voltage VD1 and VD2.

The method of measuring the distance using the depth pixel Z8 of FIG. 29 is similar to the method of FIG. 28 using the depth pixel Z7 of FIG. 26. In the depth pixel Z8 of FIG. 29, the demodulation signals DEM1 and DEM2 are applied to the ring-shaped collection gate CG during the first and second integration time intervals TINT1 and TINT2 to store the photo-charges in the ring-shaped storage node SD spaced apart from the inner surface of the ring-shaped photo-detection region PD, whereas, in the depth pixel Z7 of FIG. 26, the demodulation signals DEM1 and DEM2 are applied to the ring-shaped photo gate PG during the first and second integration time intervals TINT1 and TINT2 to store the photo-charges in the ring-shaped bridge diffusion node BD adjacent to the inner surface of the ring-shaped photo-detection region PD.

As a result, in the depth pixel Z8 of FIG. 29, the ring-shaped storage node SD is electrically connected to the floating diffusion regions FD after each of the noise voltages VB1 and VB2 is sampled and then each of the demodulation voltages VD1 and VD2 is sampled, whereas in the depth pixel Z7 of FIG. 26, the ring-shaped bridge diffusion node BD is electrically connected to the floating diffusion region FD after each of the noise voltages VB1 and VB2 is sampled and then each of the demodulation voltages VD1 and VD2 is sampled.

As such, the noise voltages VB1 and VB2 and the demodulation voltages VD1 and VD2 may be sampled sequentially using the floating diffusion region FD disposed in the center or central portion of the ring-shaped depth pixel Z8. The generated photo-charges may be stored in the ring-shaped storage node SD corresponding to the temporary storage region TSR and each of the noise voltages VB1 and VB2 corresponding to the noises in the floating diffusion region FD may be sampled before each of the demodulation voltages VD1 and VD2 is sampled. Accordingly the SNR may be enhanced to obtain the more accurate valid voltages.

Figure 31:
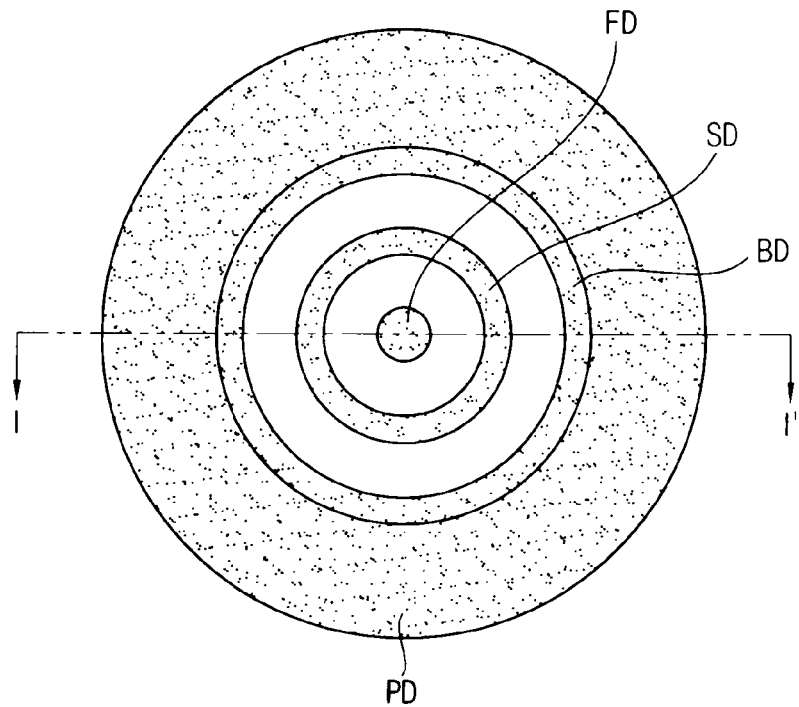
FIG. 31 is a diagram illustrating a layout of a ring-shaped depth pixel including a common floating diffusion region, a bridge diffusion node and a storage node according to an example embodiment.
Figure 32:
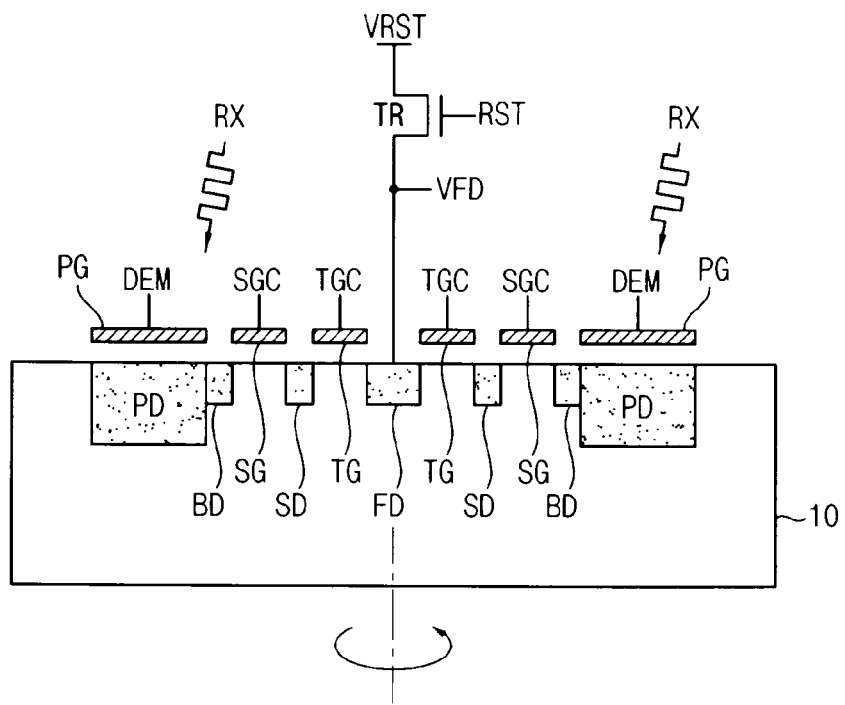
FIG. 32 is a cross-sectional diagram illustrating an example vertical structure of the depth pixel of FIG. 31.

FIG. 31 is a diagram illustrating a layout of a ring-shaped depth pixel including a common floating diffusion region, a bridge diffusion node and a storage node according to another example embodiment. FIG. 32 is a cross-sectional diagram illustrating an example vertical structure of the depth pixel taken along the line I-I' of FIG. 31.

Referring to FIGS. 31 and 32, the depth pixel Z9 may include a floating diffusion region FD, a ring-shaped storage node SD, a ring shaped bridge diffusion node BD and a ring shaped photo-detection region PD, which are formed in a semiconductor substrate 10. In addition, the depth pixel Z8 may include a ring-shaped photo gate PG, a ring-shaped storage gate SG and a ring-shaped transfer gate TG, which are formed over the semiconductor substrate 10. As illustrated in FIG. 31, the floating diffusion region FD is disposed at a center or central portion of the depth pixel Z8, the ring-shaped photo gate PG and the ring-shaped storage node SD corresponding to the temporary storage region TSR surrounds the floating diffusion region FD and the ring-shaped photo-detection region PD surrounds the temporary storage region TSR. As such, the depth pixel Z9 may have an overall ring shape.

The depth pixel Z9 includes the one floating diffusion region FD to sequentially sample a plurality of demodulation voltages VD1 and VD2 in response to a plurality of demodulation signals DEM1 and DEM2 having phases different from each other. For example, the first demodulation signal DEM1 may be applied firstly to the ring-shaped photo gate PG to sample the first demodulation voltage VD1 and then the second demodulation signal DEM2 may be applied secondly to the ring-shaped photo gate PG to sample the second demodulation voltage VD2. As such, two or more demodulation voltages may be sampled sequentially using two or more demodulation signals having different phases.

The ring-shaped bridge diffusion node BD corresponding to a portion of the temporary storage region TSR is formed adjacent to the inner surface of the ring-shaped photo-detection region PD. The ring-shaped storage node SD corresponding to another portion of the temporary storage region TSR is formed spaced apart from an inner surface of the ring-shaped bridge-diffusion node BD. The ring-shaped photo gate PG is formed over the ring-shaped photo-detection region PD and the ring-shaped storage gate SG is formed over the semiconductor substrate 10 between the ring-shaped photo-detection region PD and the ring-shaped bridge diffusion node BD. The photo-charges generated in the ring-shaped photo-detection region PD are stored in the ring-shaped bridge diffusion node BD in response to each of the demodulation signals DEM1 and DEM2 applied to the ring-shaped photo gate PG. That is, for example, the photo-charges corresponding to the phases of the demodulation signals DEM1 and DEM2 are stored sequentially in the ring-shaped bridge diffusion node BD. The ring-shaped channel is formed in the upper surface portion of the semiconductor substrate 10 in response to the storage control signal SGC, and the ring-shaped storage node SD may be electrically connected to the ring-shaped bridge diffusion node BD through the formed channel. The ring-shaped channel is formed in the upper surface portion of the semiconductor substrate 10 in response to the transfer control signal TGC, and the ring-shaped storage node SD may be electrically connected to the floating diffusion region FD through the formed channel. The reset voltage VRST may be applied to the floating diffusion region FD in response to the reset signal RST. The floating diffusion region voltage VFD may be sequentially sampled as the noise voltage VB1 and VB2 and the demodulation voltage VD1 and VD2.

Figure 33:
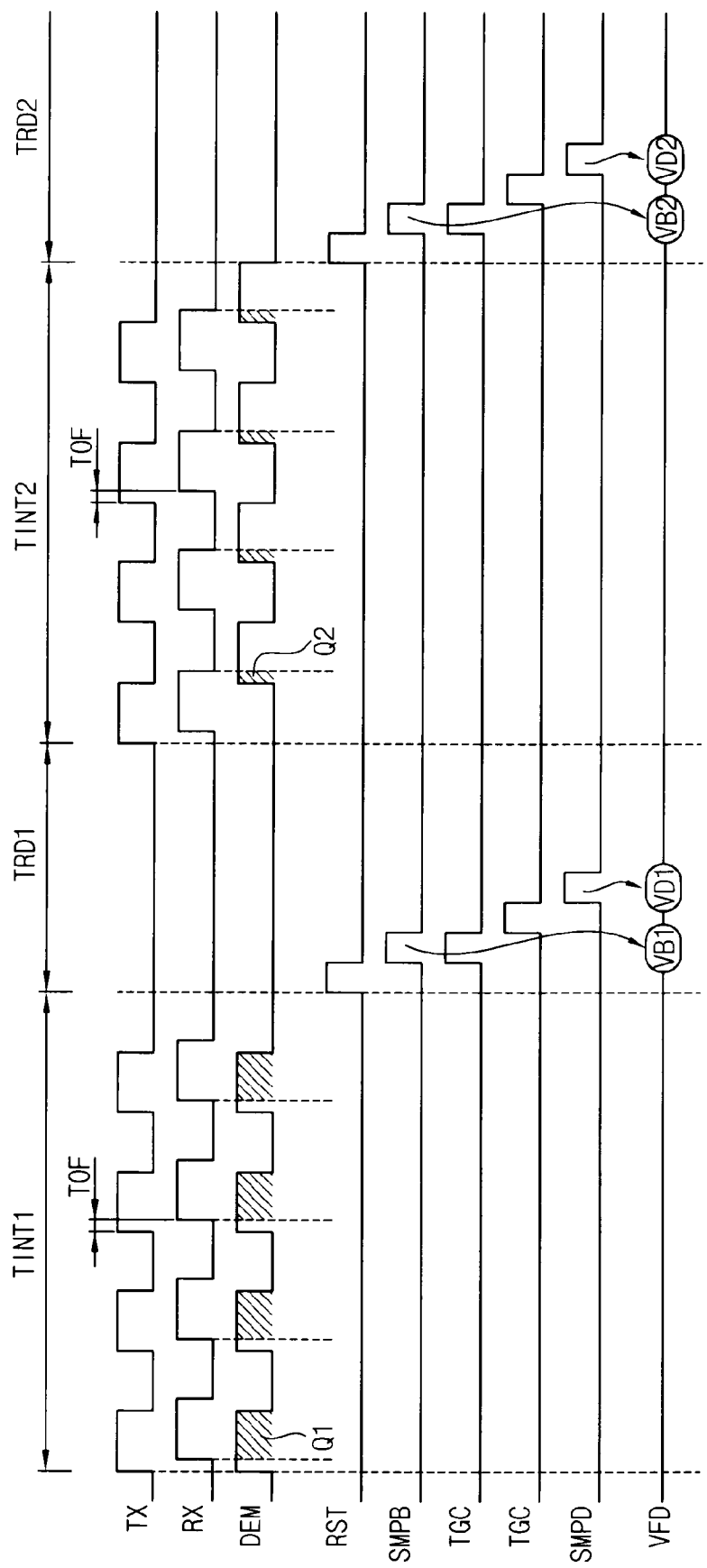
FIG. 33 is a timing diagram illustrating a method of operating a photo-sensing device including the depth pixel of FIG. 32.

FIG. 33 is an example timing diagram illustrating a method of operating a photo-sensing device including the depth pixel of FIG. 32.

The method of FIG. 33 using the depth pixel Z9 of FIG. 31 is similar to the method of FIG. 28 using the depth pixel Z7 of FIG. 26. Compared with the method of FIG. 28, the method of FIG. 33 further includes electrically-connecting the ring-shaped bridge diffusion nodes BD and the ring-shaped storage node SD in response to the storage control signal SGC during the first and second readout time intervals TRD1 and TRD2. Even though the storage control signal SGC is activated concurrently or simultaneously with the first sampling control signal SMPB in FIG. 33, it is sufficient that the storage control signal SGC is activated after each of the integration time intervals TINT1 and TINT2 and before the transfer control signal TGC is activated.

As a result, in the depth pixel Z9 of FIG. 31, the ring-shaped storage node SD is electrically connected to the floating diffusion region FD after each of the noise voltages VB1 and VB2 is sampled and then each of the demodulation voltages VD1 and VD2 is sampled, whereas in the depth pixel Z7 of FIG. 26, the ring-shaped bridge diffusion node BD is electrically connected to the floating diffusion region FD after each of the noise voltages VB1 and VB2 is sampled and then each of the demodulation voltage VD1 and VD2 is sampled.

As such, the noise voltages VB1 and VB2 and the demodulation voltages VD1 and VD2 may be sampled sequentially using the floating diffusion region FD disposed in the center or central portion of the ring-shaped depth pixel Z9. The generated photo-charges may be stored in the ring-shaped bridge diffusion node BD and the ring-shaped storage node SD corresponding to the temporary storage region TSR and each of the noise voltages VB1 and VB2 corresponding to the noises in the floating diffusion region FD may be sampled before each of the demodulation voltages VD1 and VD2 is sampled. Accordingly the SNR may be enhanced to obtain the more accurate valid voltages.

Figure 34:
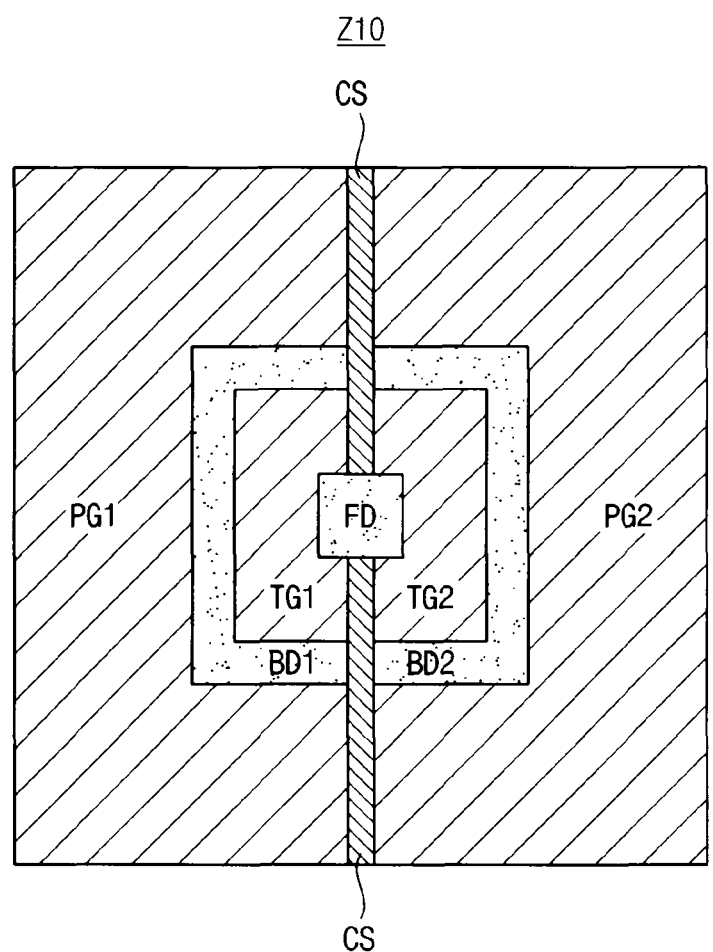
FIG. 34 is a diagram illustrating a layout of a ring-shaped depth pixel according to an example embodiment.

FIG. 34 is a diagram illustrating a layout of a ring-shaped depth pixel according to another example embodiment.

The depth pixel Z10 of FIG. 34 is similar to the depth pixel Z7 of FIG. 26 in that the depth pixel Z10 has the ring-shape centered on the floating diffusion region FD, and similar to the depth pixel Z4 of FIG. 18 in that the depth pixel Z10 is divided into the two half pixels by the channel stop region CS.

The ring-shaped photo gate is divided into a first photo gate segment PG1 and a second photo gate segment PG2, which are electrically separated from each other by the channel stop region CS. The ring-shaped photo-detection region (not shown) may be divided into a first photo-detection segment that is formed under the first photo gate segment PG1 and a second photo-detection segment that is formed under the second photo gate segment PG2. The first and second photo-detection segments are electrically separated from each other by the channel stop region CS. The first photo-detection segment may collect a first photo-charge corresponding to a first demodulation signal, and the second photo-detection segment may collect a second photo-charge corresponding to a second demodulation signal. The ring-shaped bridge diffusion node corresponding to the temporary storage region TSR is divided into a first temporary storage segment BD1 and a second temporary storage segment BD2, which are electrically separated from each other by the channel stop region CS. According to such configuration, the first temporary storage segment BD1 may store the first photo-charge generated in the first photo-detection segment in response to a first demodulation signal applied to the first photo gate segment PG1, and the second temporary storage segment BD2 may store the second photo-charge generated in the second photo-detection segment in response to a second demodulation signal applied to the second photo gate segment PG2.

For example, as described with reference to FIGS. 18, 19 and 20, the first demodulation signal DEM1 having the same or substantially the same phase as the modulated transmission light TX may be applied to the first photo gate segment PG1 and the second demodulation signal DEM2 having the opposite phase to the modulated transmission light TX may be applied to the second photo gate segment PG2 during the integration time interval TINT. The demodulation voltages VD1 and VD2 corresponding to the respective phased of the demodulation signals DEM1 and DEM2 may be sampled sequentially.

Figure 35:
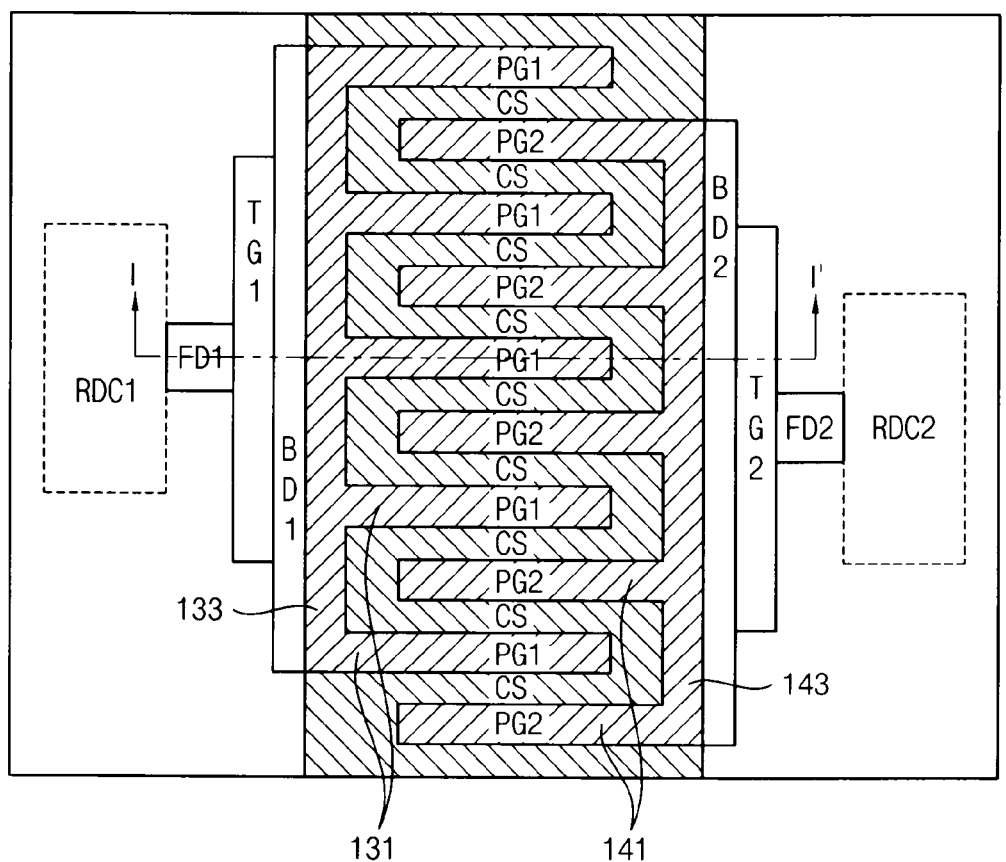
FIG. 35 is a diagram illustrating a layout of a depth pixel according to an example embodiment.

FIG. 35 is a diagram illustrating a layout of a depth pixel according to another example embodiment.

Referring to FIG. 35, the depth pixel Z11 includes a first photo gate PG1, a second photo gate PG2, a first bridge diffusion node BD1, a second bridge diffusion node BD2, a first transfer gate TG1, a second transfer gate TG2, a first floating diffusion region FD1, a second floating diffusion region FD2, a first output unit RDC1, a second output unit RDC2, and a channel stop region CS.

As illustrated in FIG. 35, the first photo gate TG1 and the second photo gate TG2 may be formed over a semiconductor substrate 110 such that the first photo gate TG1 and the second photo gate TG2 are disposed point-symmetrically without an overlapped region. The first bridge diffusion node BD1 and the second bridge diffusion node BD2 may store the photo-charges in response to the demodulation signals applied to the photo gates PG1 and PG2, respectively. For example, the first photo gate PG1 and the second photo gate PG2 may collect electrons from electron-hole pairs generated by photons incident on the photo-detection regions under the photo gates PG1 and PG2.

In at least some example embodiments, the first photo gate PG1 and the second photo gate PG2 may be formed of polysilicon. In at least some other example embodiments, the photo gates PG1 and PG2 may be formed of transparent conducting oxide (TCO), such as indium tin oxide (ITO), indium zinc oxide (IZO), zinc oxide (ZnO), titanium dioxide ($TiO_2$), etc.

As illustrated in FIG. 35, the first photo gate PG1 may include a first junction gate 133 extending in a first direction and a plurality of first finger gates 131 extending from the first junction gate 133 in a second direction perpendicular or substantially perpendicular to the first direction. The first finger gates 131 may be parallel or substantially parallel and separated from one another. In at least some example embodiments, the first junction gate 133 and the first finger gates 131 may be formed at the same or substantially the same layer. In at least some other example embodiments, the first junction gate 133 and the first finger gates 131 may be formed at different layers and electrically connected through at least one interlayer contact such as a via.

The first junction gate 133 and the first finger gates 131 may generate a charge collection region under the gates 133 and 131 to collect charges generated in the photo-detection region in the semiconductor substrate. The first junction gate 133 may provide a path through which charges collected under the respective first finger gates 131 are transferred. That is, for example, the first junction gate 133 may gather the charges collected under the respective first finger gates 131 under the first junction gate 133. Accordingly, the first junction gate 133 may improve charge transfer efficiency of the charges collected under the respective first finger gates 131.

The second photo gate PG2 may include a second junction gate 143 and a plurality of second finger gates 141. The first photo gate PG1 and the second photo gate PG2 may have the same or substantially the same shape, and be disposed point-symmetrically without an overlapped region. The first finger gates 131 and the second finger gates 141 may be arranged alternately with one another. That is, for example, at least one of the second finger gates 141 may be located between two of the first finger gates 131. Accordingly data errors caused by imbalance or asymmetry between the first photo gate PG1 and the second photo gate PG2 may be reduced.

For example, each of the first and the second finger gates 131 and 141 may have a width ranging from about 0.25 µm to about 1 µm, inclusive, and a length ranging from about 3 µm to about 30 µm, inclusive. An interval between adjacent two finger gates may be from about 0.25 µm to about 3 µm, inclusive. Each of the first and the second junction gates 133 and 143 may have a width of about 1 µm and a length ranging from about 3 µm to about 30 µm, inclusive. The width, the length or the interval of the finger gate or the junction gate may be varied depending on a size of the depth pixel Z11 or a design rule. While each photo gate illustrated in FIG. 35 includes five finger gates, the number of the finger gates included in the photo gate may be varied depending on the size of the depth pixel Z11 or the design rule.

The first and second transfer gates TG1 and TG2 are formed over the semiconductor substrate. The first transfer gate TG1 is disposed between the first bridge diffusion node BD1 and the first floating diffusion region FD1 and the second transfer gate TG2 is disposed between the second bridge diffusion node BD2 and the second floating diffusion region FD2. The transfer gates TG1 and TG2 may electrically connect the bridge diffusion nodes BD1 and BD2 and the floating diffusion regions FD1 and FD2, respectively, to transfer the photo-charges from the bridge diffusion nodes BD1 and BD2 to the floating diffusion regions FD1 and FD2.

The first finger gates 131 are coupled to the first junction gate 133, and the first transfer gate TG1 is formed adjacent to the first junction gate 133. Thus, the first junction gate 133 and the first transfer gate TG1 may provide a charge transfer path through which the charges collected under the first finger gates 131 are transferred to the first floating diffusion region FD1. Similarly, the second junction gate 143 and the second transfer gate TG2 may provide a charge transfer path through which the charges collected under the second finger gates 141 are transferred to the second floating diffusion region FD2. Therefore, the depth pixel Z11 may include only one floating diffusion region per half-pixel. Since the depth pixel Z11 may include the reduced number of floating diffusion regions, fill factor may be improved and dark current and parasitic capacitance may be reduced.

The first output unit RDC1 and the second output unit RDC2 may output electrical signals corresponding to the charges accumulated in the first floating diffusion region FD1 and the second floating diffusion region FD, respectively. In an example embodiment, the first output unit RDC1 may include a first reset transistor for discharging the charges accumulated in the first floating diffusion region FD1, a first drive transistor for amplifying a voltage of the first floating diffusion region FD1, a first select transistor for outputting the voltage amplified by the first drive transistor to a first column line. The second output unit RDC2 may include a second reset transistor for discharging the charges accumulated in the second floating diffusion region FD2, a second drive transistor for amplifying a voltage of the second floating diffusion region FD2, a second select transistor for outputting the voltage amplified by the second drive transistor to a second column line.

As described above, since the finger gates extend from the junction gate and the transfer gate is formed adjacent to the junction gate, the depth pixel Z11 according to an example embodiment may include a single floating diffusion region per half-pixel, and improve the charge transfer efficiency.

The channel stop region CS may be formed in the semiconductor substrate between the first photo gate PG1 and the second photo gate PG2. That is, for example, the channel stop region CS may be formed between the first photo-detection region under the first photo gate PG1 and the second photo-detection region under the second photo gate PG2.

The channel stop region CS may reduce the charge transfer between the first photo-detection region and the second photo-detection region. The noises due to the charge transfer may be reduced by forming the channel stop region CS to form a potential wall between the two photo gates PG1 and PG2.

Figure 36:
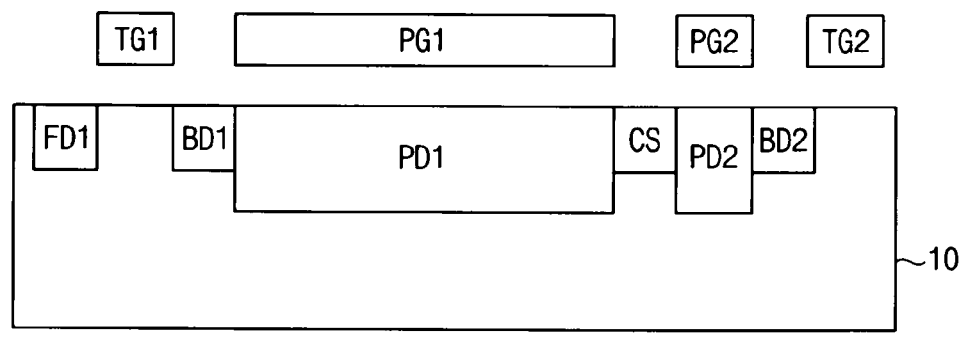
FIG. 36 is a cross-sectional diagram illustrating an example vertical structure of the depth pixel of FIG. 35.

FIG. 36 is a cross-sectional diagram illustrating an example vertical structure of the depth pixel taken along the line I-I' of FIG. 35.

Referring to FIG. 36, the first photo gate TG1 is formed over the first photo-detection region PD1 in the semiconductor substrate 10. The first bridge diffusion node BD1 may be formed in the semiconductor substrate 10 adjacent to the first photo-detection region PD1. The first floating diffusion region FD1 may be formed in the semiconductor substrate 10 spaced apart from the first bridge diffusion node BD1. The first transfer gate TG1 is formed over the semiconductor substrate 10 between the first bridge diffusion node BD1 and the first floating diffusion region FD1. The second photo gate TG2 is formed over the second photo-detection region PD2 in the semiconductor substrate 10. The second bridge diffusion node BD2 may be formed in the semiconductor substrate 10 adjacent to the second photo-detection region PD2. The second floating diffusion region FD2 (not shown) may be formed in the semiconductor substrate 10 spaced apart from the second bridge diffusion node BD2. The second transfer gate TG1 is formed over the semiconductor substrate 10 between the first bridge diffusion node BD1 and the second floating diffusion region FD1. The channel stop region CS may be formed in the semiconductor substrate 10 between the first and second photo-detection regions PD1 and PD2. The channel stop region CS may be doped relatively highly with the P-type impurities.

Figure 37:
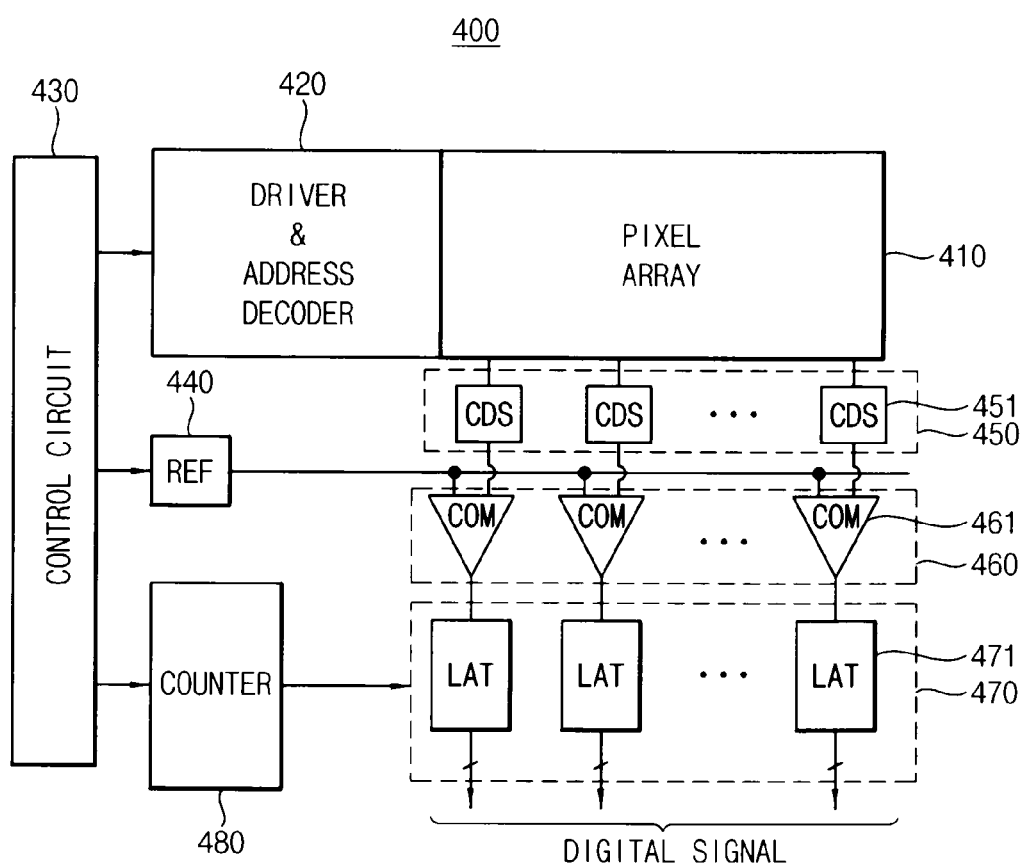
FIGS. 37, 38 and 39 are block diagrams illustrating image sensors according to example embodiments.
Figure 38:
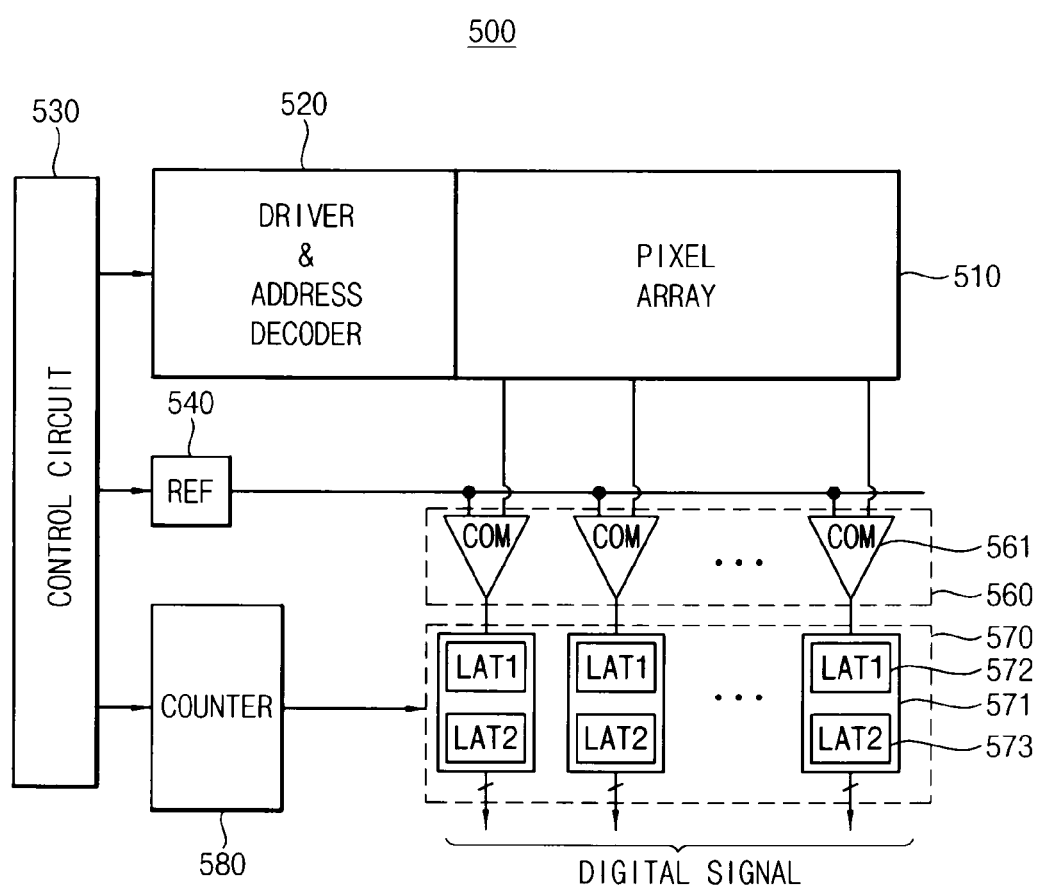
Figure 39:
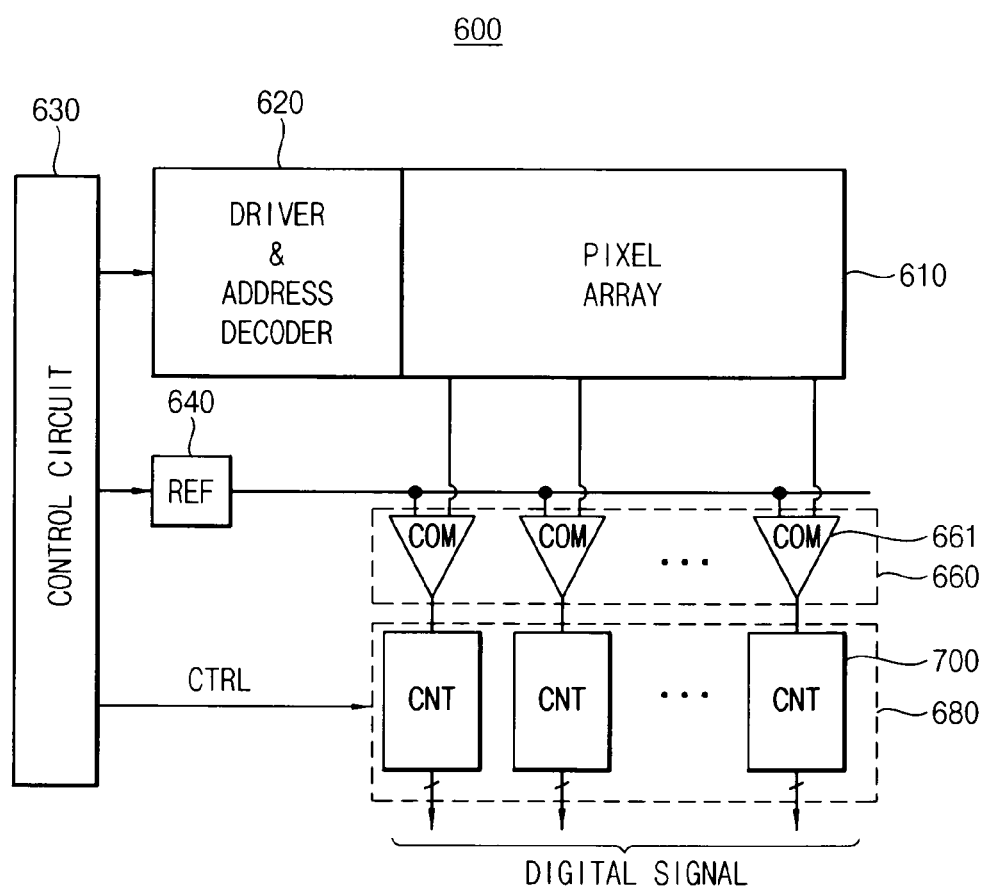

FIGS. 37, 38 and 39 are block diagrams illustrating image sensors according to example embodiments.

FIGS. 37 and 38 illustrate example embodiments of image sensors including a common counter with respect to a plurality of column lines. FIG. 39 illustrates an example embodiment of an image sensor including a plurality of counters with respect to a plurality of column lines.

Referring to FIG. 37, an image sensor 400 may include a pixel array 410, a driver/address decoder 420, a control circuit 430, a reference signal generator 440, a correlated double sampling (CDS) unit 450, a comparison unit 460 and a latch unit 470.

In the field of image apparatuses, image sensors of a charge-coupled device (CCD) type or a complementary metal oxide semiconductor (CMOS) type are widely used for capturing an image by sensing incident light. The image sensor 400 of FIG. 37 may be a CCD image sensor or a CMOS image sensor.

In an example of the CMOS image sensor, the pixel array 410 includes a plurality of pixels for converting incident light into electrical analog signals. In the image sensor including unit cells referred to as active pixels or gain cells, a respective signal from each pixel is detected by an address control of the pixels. The active pixel sensor is a type of address-controlled image sensor, and the driver/address decoder 420 controls operation of the pixel array 410 by unit of a column and/or a row. The control circuit 430 generates control signals for controlling operations of the other components of the image sensor 400.

The analog signals detected by the pixel array 410 are converted into digital signals by an ADC including the comparison unit 460, the latch unit 470, and the counter 480. The analog signals are output typically column by column, and thus the CDS unit 450, the comparison unit 460 and the latch unit 470 include a plurality of CDS circuits 451, a plurality of comparators 461 and a plurality of latches 471 according to the column number of the pixel array 410.

The analog signals output from the pixel array have variations in a reset component due to respective characteristic of each pixel referred to as a fixed pattern noise (FPN) and respective characteristic of each logic circuit for outputting a voltage signal from a corresponding pixel. Accordingly an effective signal component needs to be obtained by subtracting the respective reset component from the measured signal component. As such, obtaining the effective signal component corresponding to the difference between the reset component and the measured signal component is referred to as CDS.

The CDS unit 450 performs an analog double sampling (ADS) by obtaining the difference between the reset component and the measured signal component using capacitors and switches, and outputs analog signals corresponding to the effective signal components. The comparison unit 460 compares the analog signals output column by column from the CDS unit 450 with the reference signal (e.g., the ramp signal RAMP) from the reference signal generator 440, and outputs comparison signals column by column. The comparison signals have respective transition timings according to respective effective signal components. The count signals from the counter 480 are commonly provided to the latches 471. The latches 471 latch the count signals in response to the respective comparison signals and output the latched digital signals column by column.

The ADS may be performed using the image sensor 400 of FIG. 37 and also a digital double sampling (DDS) may be performed as will be described referring to FIGS. 38 and 39. DDS is one of the CDS where the analog signals corresponding to the reset component and the measured signal component are converted into the digital signals, respectively, and the effective signal component is obtained by calculating the difference between the two digital signals.

The image sensor 500 of FIG. 38 has a configuration for performing DDS whereas the image sensor 400 of FIG. 37 has a configuration for performing ADS. Each latch 571 coupled to each column includes a first latch 572 and a second latch 573. The pixel array 510 outputs sequentially a first analog signal and a second analog signal for CDS, where the first analog signal indicates a reset component, for example, the above-mentioned noise voltage VB and the second analog signal indicates a measured image component (e.g., the above-mentioned demodulation voltage VD).

In a first sampling, each comparator 561 compares the first analog signal indicating the reset component with a ramp signal from the reference signal generator 540 and outputs the comparison signal having a transition time point corresponding to the reset component. Such operations are performed with respect to each column. The count signals from the counter 580 are commonly provided to each latch 571, and each latch 571 latches the count signals at each transition time point of the corresponding comparison signal to store a first count value in the first latch 572.

In a second sampling, each comparator 561 compares the second analog signal indicating the measured image component with the ramp signal from the reference signal generator 540 and outputs the comparison signal having a transition time point corresponding to the measured image component. Such operations are performed with respect to each column. The count signals are commonly provided to each latch 571, and each latch 571 latches the count signals at each transition time point of the corresponding comparison signal to store a second count value in the second latch 573. The first and second count values stored in the first and second latches 572 and 573 are provided to internal logic circuits to calculate values corresponding to the effective image components. As such, DDS may be performed by the image sensor 500.

The image sensors 400 and 500 of FIGS. 37 and 38 include the common counter for performing CDS. As will be described with reference to FIG. 39, an image sensor may also include a plurality of counters coupled column by column, which may be referred to as column counters, to enhance the operation speed of the image sensor.

Referring to FIG. 39, an image sensor 600 may include a pixel array 610, a driver/address decoder 620, a control circuit 630, a reference signal generator 640, a comparison unit 660 and a counting block 680.

The pixel array 610 includes a plurality of pixels for converting incident light into electrical analog signals. The driver/address decoder 620 controls operation of the pixel array 410 by unit of a column and/or a row. The control circuit 630 generates control signals CTRL for controlling operations of the other components of the image sensor 600.

The analog signals detected by the pixel array 610 are converted into digital signals by an ADC including the comparison unit 660 and the counting block 680. The analog signals are output column by column, and thus, the comparison unit 660 and counting block 680 include a plurality of comparators 661 and a plurality of counters 700 according to the column number of the pixel array 610. Using the plurality of comparators 660 and counters 700 coupled to each column, the image sensor 600 may concurrently or simultaneously process a plurality of pixel signals corresponding one row, thereby enhancing an operation speed and reducing noise.

The pixel array 610 outputs sequentially a first analog signal and a second analog signal for CDS, where the first analog signal indicates a reset component and the second analog signal indicates a measured image component. Based on the first and second analog signals, the ADC including the comparison unit 660 and the counting block 680 performs CDS digitally, that is, performs DDS with respect to the respective columns.

Figure 40:
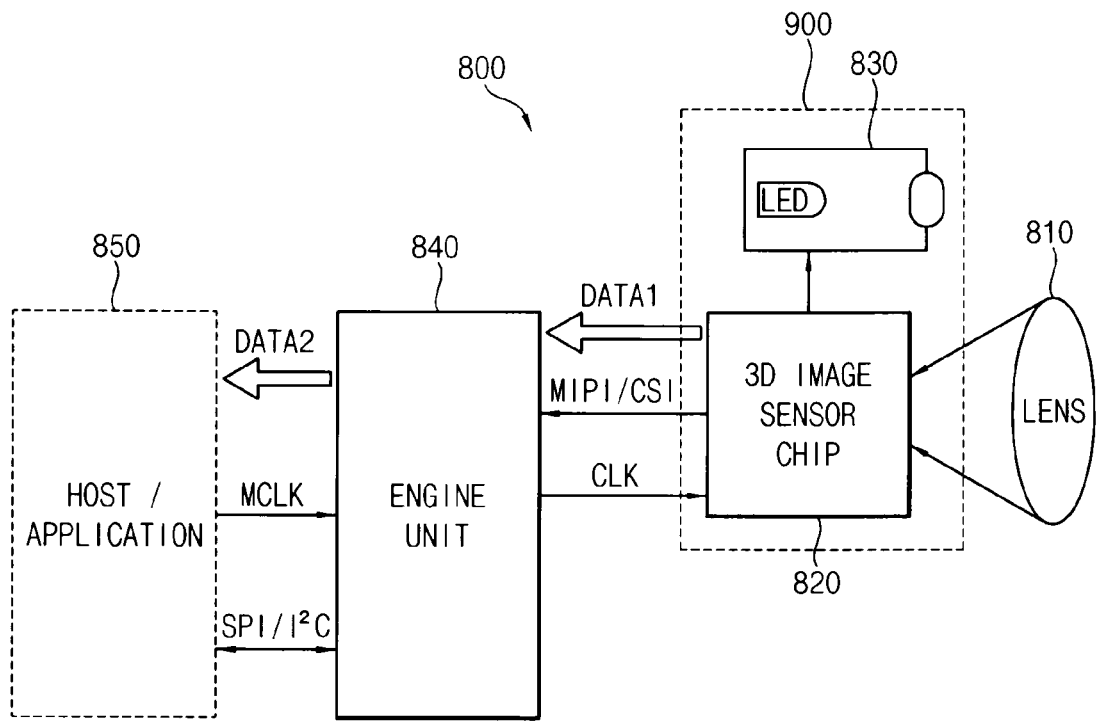
FIG. 40 illustrates a block diagram of an example embodiment of a camera including a three-dimensional image sensor.

FIG. 40 illustrates a block diagram of an example embodiment of a camera including a three-dimensional image sensor.

Referring to FIG. 40, a camera 800 includes a photo-receiving lens 810, a three-dimensional image sensor 900 and an engine unit 840. The three-dimensional image sensor 900 may include a three-dimensional image sensor chip 820 and a light source module 830. According to at least some example embodiments, the three-dimensional image sensor chip 820 and the light source module 830 may be implemented with separated devices, or at least a portion of the light source module 830 may be included in the three-dimensional image sensor chip 820. In at least some example embodiments, the photo-receiving lens 810 may be included in the three-dimensional image sensor chip 820.

The photo-receiving lens 810 may focus incident light on a photo-receiving region (e.g., depth pixels and/or color pixels included in a pixel array) of the three-dimensional image sensor chip 820. The three-dimensional image sensor chip 820 may generate data DATA1 including depth information and/or color image information based on the incident light passing through the photo-receiving lens 810. For example, the data DATA1 generated by the three-dimensional image sensor chip 820 may include depth data generated using infrared light or near-infrared light emitted from the light source module 830 and RGB data of a Bayer pattern generated using external visible light. The three-dimensional image sensor chip 820 may provide the data DATA1 to the engine unit 840 based on a clock signal CLK. In at least some example embodiments, the three-dimensional image sensor chip 820 may interface with the engine unit 840 via mobile industry processor interface (MIPI) and/or camera serial interface (CSI).

The engine unit 840 controls the three-dimensional image sensor 900. The engine unit 840 may process the data DATA1 received from the three-dimensional image sensor chip 820. For example, the engine unit 840 may generate three-dimensional color data based on the data DATA1 received from the three-dimensional image sensor chip 820. In other examples, the engine unit 840 may generate YUV data including a luminance component, a blue-luminance difference component, and a red-luminance difference component based on the RGB data included in the data DATA1, or compressed data, such as joint photography experts group (JPEG) data. The engine unit 840 may be connected to a host/application 850 and may provide data DATA2 to the host/application 850 based on a master clock MCLK. Further, the engine unit 840 may interface with the host/application 850 via serial peripheral interface (SPI) and/or inter integrated circuit (12C).

Figure 41:
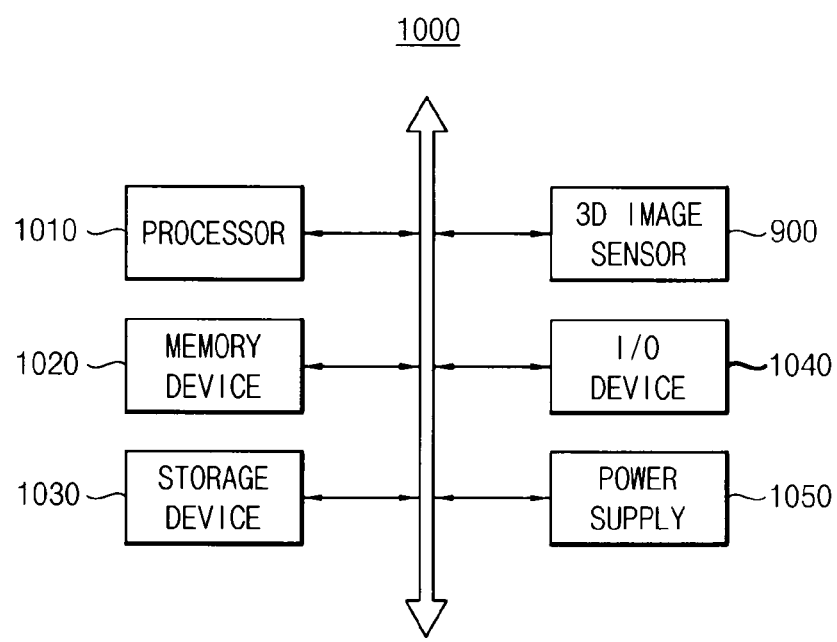
FIG. 41 illustrates a block diagram of an example embodiment of a computer system including a three-dimensional image sensor.

FIG. 41 illustrates a block diagram of an example embodiment of a computer system including a three-dimensional image sensor.

Referring to FIG. 41, a computing system 1000 may include a processor 1010, a memory device 1020, a storage device 1030, an input/output device 1040, a power supply 1050 and a three-dimensional image sensor 900. Although it is not illustrated in FIG. 41, the computing system 1000 may further include ports that communicate with a video card, a sound card, a memory card, a universal serial bus (USB) device, or other electronic devices.

The processor 1010 may perform various calculations or tasks. According to at least some example embodiments, the processor 1010 may be a microprocessor or a CPU. The processor 1010 may communicate with the memory device 1020, the storage device 1030 and the input/output device 1040 via an address bus, a control bus, and/or a data bus. In at least some example embodiments, the processor 1010 may be coupled to an extended bus, such as a peripheral component interconnection (PCI) bus. The memory device 1020 may store data for operating the computing system 1000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device may include a solid state drive (SSD), a hard disk drive (HDD), a CD-ROM, etc. The input/output device 1040 may include an input device (e.g., a keyboard, a keypad, a mouse, etc.) and an output device (e.g., a printer, a display device, etc.). The power supply 1050 supplies operation voltages for the computing system 1000.

The three-dimensional image sensor 900 may communicate with the processor 1010 via the buses or other communication links. As described above, the three-dimensional image sensor 900 may include a unit pixel having a ring-shaped structure, which operates as a single-tap detector. Further, as described above, the three-dimensional image sensor 900 may use a plurality of variable bin signals to measure a distance to an object. Accordingly, the sensitivity and the signal-to-noise ratio (SNR) may be improved. The three-dimensional image sensor 900 may be integrated with the processor 1010 in one chip, or the three-dimensional image sensor 900 and the processor 1010 may be implemented as separate chips.

The three-dimensional image sensor 900 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The computing system 1000 may be any computing system using a three-dimensional image sensor. For example, the computing system 1000 may include a digital camera, a mobile phone, a smart phone, a portable multimedia player (PMP), a personal digital assistant (PDA), etc.

FIG. 42 illustrates a block diagram of an example embodiment of an interface employable in the computing system of FIG. 41.

Referring to FIG. 42, a computing system 1100 may be implemented by a data processing device that uses or supports a mobile industry processor interface (MIPI) interface. The computing system 1100 may include an application processor 1110, a three-dimensional image sensor 1140, a display device 1150, etc. A CSI host 1112 of the application processor 1110 may perform a serial communication with a CSI device 1141 of the three-dimensional image sensor 1140 via a camera serial interface (CSI). In at least some example embodiments, the CSI host 1112 may include a deserializer (DES), and the CSI device 1141 may include a serializer (SER). A DSI host 1111 of the application processor 1110 may perform a serial communication with a DSI device 1151 of the display device 1150 via a display serial interface (DSI).

In at least some example embodiments, the DSI host 1111 may include a serializer (SER), and the DSI device 1151 may include a deserializer (DES). The computing system 1100 may further include a radio frequency (RF) chip 1160 performing a communication with the application processor 1110. A physical layer (PHY) 1113 of the computing system 1100 and a physical layer (PHY) 1161 of the RF chip 1160 may perform data communications based on a MIPI DigRF. The application processor 1110 may further include a DigRF MASTER 1114 that controls the data communications of the PHY 1161.

The computing system 1100 may further include a global positioning system (GPS) 1120, a storage 1170, a MIC 1180, a DRAM device 1185, and a speaker 1190. In addition, the computing system 1100 may perform communications using an ultra wideband (UWB) 1120, a wireless local area network (WLAN) 1220, a worldwide interoperability for microwave access (WIMAX) 1130, etc. However, the structure and the interface of the electric device 1000 are not limited thereto.

Features and/or embodiments described herein may be applied to any photo-detection device, such as a three-dimensional image sensor providing image information and depth information about an object. For example, one or more example embodiments may be applied to a computing system, such as a face recognition security system, a desktop computer, a laptop computer, a digital camera, a three-dimensional camera, a video camcorder, a cellular phone, a smart phone, a personal digital assistant (PDA), a scanner, a video phone, a digital television, a navigation system, an observation system, an auto-focus system, a tracking system, a motion capture system, an image-stabilizing system, etc.

The foregoing is illustrative of example embodiments and is not to be construed as limiting thereof. Although a few example embodiments have been described, those skilled in the art will readily appreciate that many modifications are possible in the exemplary embodiments without materially departing from the novel teachings and advantages of the present inventive concepts. Accordingly, all such modifications are intended to be included within the scope of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of operating a photo-sensing device including at least one depth pixel, the method comprising:
    illuminating an object with modulated transmission light;
    storing a photo-charge in a storage region of the at least one depth pixel in response to a demodulation signal, the photo-charge being generated in a photo-detection region of the at least one depth pixel by light reflected by the object;
    sampling a noise voltage of a floating diffusion region of the at least one depth pixel after a reset voltage is applied to the floating diffusion region and before sampling a demodulation voltage of the floating diffusion region;
    electrically-connecting the storage region and the floating diffusion region after sampling the noise voltage;
    sampling the demodulation voltage of the floating diffusion region after electrically-connecting the storage region and the floating diffusion region; and
    determining a voltage corresponding to a phase of the demodulation signal based on the noise voltage and the demodulation voltage.

2. The method of claim 1, wherein a reset voltage is applied to the floating diffusion region after the photo-charge is stored in the storage region.

3. The method of claim 1, wherein a reset voltage is applied to the floating diffusion region continuously while the photo-charge is stored in the storage region.

4. The method of claim 1, wherein the storing of the photo-charge in the storage region in response to the demodulation signal comprises:
    storing the photo-charge in a bridge diffusion node in response to the demodulation signal, the bridge diffusion node being adjacent to the photo-detection region.

5. The method of claim 4, wherein the bridge diffusion node and the floating diffusion region are electrically-connected after sampling the noise voltage, but before sampling the demodulation voltage.

6. The method of claim 1, wherein the storing of the photo-charge in the storage region in response to the demodulation signal comprises:
    storing the photo-charge in a storage node in response to the demodulation signal, the storage node being spaced apart from the photo-detection region.

7. The method of claim 6, wherein the storage node and the floating diffusion region are electrically-connected after sampling the noise voltage, but before sampling the demodulation voltage.

8. The method of claim 1, wherein the storing of the photo-charge in the storage region in response to the demodulation signal comprises:
    storing the photo-charge in a bridge diffusion node in response to the demodulation signal, the bridge diffusion node being adjacent to the photo-detection region; and
    electrically connecting the bridge diffusion node and a storage node, the storage node being spaced apart from the bridge diffusion node.

9. The method of claim 8, wherein the storage node and the floating diffusion region are electrically-connected after sampling the noise voltage, but before sampling the demodulation voltage.

10. The method of claim 1, wherein the at least one depth pixel includes a plurality of floating diffusion regions, and wherein a plurality of demodulation voltages of the plurality of floating diffusion regions are sampled in response to a plurality of demodulation signals, the plurality of demodulation signals having different phases.

11. The method of claim 1, wherein a plurality of demodulation voltages are sampled sequentially in response to a plurality of demodulation signals, the plurality of demodulation signals having different phases.

12. A method of operating a photo-sensing device including at least one depth pixel, the at least one depth pixel including a storage region and a floating diffusion region, the method comprising:
    first sampling a noise voltage at the floating diffusion region;
    second sampling a demodulation voltage at the floating diffusion region after sampling the noise voltage, the demodulation voltage corresponding to a photo-charge stored in the storage region, the photo-charge being generated based on light incident on the at least one depth pixel; and
    determining a voltage corresponding to a phase of a demodulation signal based on the sampled noise voltage and the sampled demodulation voltage.

13. The method of claim 12, further comprising:
    electrically connecting the storage region with the floating diffusion region after the first sampling, but before the second sampling.

14. The method of claim 12, further comprising:
illuminating an object with modulated transmission light; and storing the photo-charge in the storage region in response to the demodulation signal, the photo-charge being generated in a photo-detection region of the at least one depth pixel in response to light reflected by the object.

15. The method of claim 14, wherein the storing of the photo-charge in the storage region comprises:
storing the photo-charge in a bridge diffusion node in response to the demodulation signal, the bridge diffusion node being adjacent to the photo-detection region.

16. The method of claim 14, wherein the storing of the photo-charge in the storage region comprises:
storing the photo-charge in a storage node in response to the demodulation signal, the storage node being spaced apart from the photo-detection region.

17. The method of claim 12, further comprising:
applying a reset voltage to the floating diffusion region prior to the first sampling.

\* \* \* \* \*